(12) United States Patent
Hilloulin et al.

(10) Patent No.: US 12,724,823 B2
(45) Date of Patent: Sep. 1, 2026

(54) FAST AND MEMORY EFFICIENT IN-MEMORY COLUMNAR GRAPH UPDATES WHILE PRESERVING ANALYTICAL PERFORMANCE

(71) Applicant: Oracle International Corporation, Redwood Shores, CA (US)

(72) Inventors: Damien Hilloulin, Zurich (CH); Vasileios Trigonakis, Zurich (CH); Alexander Weld, Mountain View, CA (US); Valentin Venzin, Zurich (CH); Sungpack Hong, Palo Alto, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 197 days.

(21) Appl. No.: 17/194,165

(22) Filed: Mar. 5, 2021

(65) Prior Publication Data

US 2022/0284056 A1 Sep. 8, 2022

(51) Int. Cl.
*G06F 16/901* (2019.01)
*G06F 16/22* (2019.01)

(52) U.S. Cl.
CPC ...... *G06F 16/9024* (2019.01); *G06F 16/2282* (2019.01)

(58) Field of Classification Search
CPC ......................... G06F 16/9024; G06F 16/2282
USPC .......................................................... 707/798
See application file for complete search history.

(56) References Cited

U.S. PATENT DOCUMENTS 5,983,215 A 11/1999 Ross et al.
6,006,233 A 12/1999 Schultz
7,580,947 B2 8/2009 Kasravi
7,624,081 B2 11/2009 Zhao et al.
7,849,106 B1 12/2010 Agrawal
8,996,492 B2 3/2015 Paradies et al.
9,104,665 B1 8/2015 Bik et al.
(Continued)

FOREIGN PATENT DOCUMENTS

WO WO9945479 A1 9/1999
WO WO 2020/019313 A1 1/2020

OTHER PUBLICATIONS

Haprian, U.S. Appl. No. 17/162,564, filed Jan. 29, 2021, Non-Final Rejection, Feb. 3, 2022.
(Continued)

*Primary Examiner* — Amy Ng
*Assistant Examiner* — Antonio J Caiado
(74) *Attorney, Agent, or Firm* — Hickman Becker Bingham Ledesma LLP

(57) ABSTRACT

Techniques are provided for updating in-memory property graphs in a fast manner, while minimizing memory consumption. A graph is represented as delta compressed sparse rows (CSR), in which its data structure stores forward edge offsets that map reverse edges to forward edges, enabling fast traversals of graph edges in forward and reverse directions. To support fast graph updates, delta logs are used to store changes to the graph. In an embodiment, a base version of the graph data structure is initially loaded or created, and subsequent versions of the graph are created from the reference to the initial graph and a delta log data structure that records the changes compared to the base version of the graph.

18 Claims, 11 Drawing Sheets

Graph

Target Pattern

(56) References Cited

U.S. PATENT DOCUMENTS 9,195,941 B2 11/2015 Mojsilovic et al.
9,201,426 B1 12/2015 Bonawitz
9,495,477 B1* 11/2016 Dehnert .................... G06F 9/46
10,019,536 B2 7/2018 Hong et al.
10,235,474 B2 3/2019 Haubenschild et al.
10,346,138 B1 7/2019 Quillen
10,360,195 B1 7/2019 McKelvie et al.
10,824,673 B2 11/2020 Rebholz et al.
11,126,359 B2* 9/2021 Elyasi .................. G06F 3/0604
11,269,954 B2 3/2022 Kang et al.
11,537,579 B2* 12/2022 Lozi ..................... G06F 16/212
2002/0184225 A1 12/2002 Ghukasyan
2003/0195885 A1 10/2003 Emmick
2004/0133747 A1 7/2004 Coldewey
2005/0160432 A1 7/2005 Gallagher
2006/0101001 A1 5/2006 Lindsay et al.
2008/0177722 A1 7/2008 Lohman
2008/0184197 A1 7/2008 Dobbins et al.
2009/0006450 A1 1/2009 Champion
2010/0088666 A1 4/2010 Box et al.
2011/0270861 A1 11/2011 Arshavsky et al.
2011/0307685 A1 12/2011 Song
2013/0212131 A1 8/2013 Reddy
2013/0332387 A1 12/2013 Mirra et al.
2014/0214334 A1 7/2014 Plattner et al.
2014/0310232 A1 10/2014 Plattner et al.
2015/0026158 A1 1/2015 Jin
2015/0081741 A1 3/2015 Xu
2015/0120775 A1 4/2015 Shao et al.
2015/0143179 A1 5/2015 Desai
2015/0169757 A1 6/2015 Kalantzis
2015/0310644 A1* 10/2015 Zhou ....................... G06F 17/16 345/440
2015/0379054 A1 12/2015 Kernert
2016/0071233 A1* 3/2016 Macko .................. G06T 11/206 345/440
2016/0078344 A1 3/2016 Agarwal et al.
2016/0103931 A1 4/2016 Appavu
2016/0117358 A1* 4/2016 Schmid ................. G06F 9/5083 707/736
2016/0140152 A1 5/2016 Sevenich et al.
2016/0171068 A1 6/2016 Hardin
2016/0179883 A1 6/2016 Chen
2016/0179887 A1 6/2016 Lisonbee et al.
2016/0299991 A1 10/2016 Hong et al.
2016/0342708 A1 11/2016 Fokoue-Nkoutche et al.
2017/0031976 A1 2/2017 Chavan et al.
2017/0046388 A1 2/2017 Kirk et al.
2017/0090807 A1 3/2017 Gupta et al.
2017/0147706 A1* 5/2017 Roth ..................... G06F 16/278
2017/0169133 A1* 6/2017 Kim .................... G06F 16/9024
2017/0220271 A1* 8/2017 Muthukrishnan ....... G06F 9/544
2017/0255675 A1 9/2017 Chavan
2017/0293697 A1 10/2017 Youshi et al.
2018/0067987 A1 3/2018 Kang et al.
2018/0114132 A1 4/2018 Chen et al.
2018/0137667 A1* 5/2018 Kindelsberger ...... G06T 11/206
2018/0198698 A1 7/2018 Rife
2018/0218088 A1 8/2018 Fischer et al.
2018/0246986 A1* 8/2018 Haubenschild ..... G06F 16/9024
2018/0293329 A1 10/2018 Yanagisawa
2018/0329958 A1 11/2018 Choudhury
2019/0102412 A1 4/2019 Macnicol
2019/0121825 A1* 4/2019 Kim .................... G06F 16/2237
2019/0129893 A1 5/2019 Baird, III et al.
2019/0163704 A1 5/2019 Haubenschild
2019/0179752 A1 6/2019 Yoo et al.
2019/0205480 A1 7/2019 Zhang et al.
2019/0213356 A1 7/2019 Vagujhelyi et al.
2019/0311060 A1 10/2019 Bross et al.
2019/0325075 A1* 10/2019 Hilloulin ............. G06F 16/2237
2020/0059481 A1* 2/2020 Sekar .................. H04L 63/1425
2020/0097288 A1 3/2020 Schlegel et al.
2020/0097615 A1 3/2020 Song
2020/0151216 A1 5/2020 Sevenich et al.
2020/0226124 A1* 7/2020 Chishti ............... G06F 16/9024
2020/0265049 A1 8/2020 da Trindade et al.
2020/0265090 A1 8/2020 Hilloulin et al.
2020/0364268 A1 11/2020 Xu et al.
2021/0004374 A1* 1/2021 Xia ..................... G06F 16/9024
2021/0034615 A1 2/2021 Chen et al.
2021/0064660 A1 3/2021 Xu et al.
2021/0064661 A1* 3/2021 Jung .................. G06F 12/0238
2021/0149854 A1 5/2021 Barde et al.
2021/0150375 A1 5/2021 Pete et al.
2021/0157606 A1 5/2021 Zhao
2021/0240690 A1 8/2021 Cseri
2021/0256063 A1 8/2021 Kasperovics et al.
2022/0027052 A1 1/2022 Falco
2022/0114178 A1 4/2022 Haprian et al.
2022/0129451 A1 4/2022 Haprian et al.
2022/0129461 A1 4/2022 Haprian et al.
2022/0129465 A1 4/2022 Haprian et al.
2022/0245147 A1 8/2022 Segalini et al.
2022/0277021 A1* 9/2022 Cruanes ................ G06F 16/128
2022/0300504 A1 9/2022 Neugebauer et al.
2022/0405302 A1 12/2022 Grunwald
2023/0418870 A1* 12/2023 Hauck ................. G06F 16/9024

OTHER PUBLICATIONS

Hong, Sungpack, et al., "PGX.D: a fast distributed graph processing engine", SC '15: Proceedings of the Intl Conf. for High Performance, Comptg, Ntwkg, Strorage and Analysis, Article 58, pp. 1-12, https://doi.org/10.1145/2807591.2807620, Nov. 2015, 12pgs.

Patiño-Martínez et al., "Snapshot Isolation for Neo4j", 19th International Conference on Extending Database Technology (EDBT), https://openproceedings.org/2016/conf/edbt/paper-333.pdf, dated Mar. 2016, 2 pages.

Green et al., "Updating Graph Databases with Cypher", 45th International Conference on Very Large Data Bases (VLDB), vol. 12, No. 12, https://hal.archives-ouvertes.fr/hal-03012016, dated Aug. 2019, 13 pages.

Deutsch et al., "TigerGraph: A Native MPP Graph Database", https://arxiv.org/pdf/1901.08248.pdf, dated Jan. 2019, 28 pages,.

Dave et al., "GraphFrames: An Integrated API for Mixing Graph and Relational Queries", https://cs.stanford.edu/~matei/papers/2016/grades_graphframes.pdf, dated 2016, 8 pages.

Bebee et al., "Transactional Guarantees for SPARQL Query Execution with Amazon Neptune", Amazon Web Services, http://ceur-ws.org/Vol-2456/paper90.pdf, dated 2019, 2 pages.

Bebee et al., "Amazon Neptune: Graph Data Management in the Cloud", Amazon Web Services, http://ceur-ws.org/Vol-2180/paper-79.pdf, dated 2018, 2 pages.

Angles et al., "RDF and Property Graphs Interoperability: Status and Issues", http://ceur-ws.org/Vol-2369/paper01.pdf, dated 2019, 11 pages.

Nagel et al., "Recycling in Pipelined Query Evaluation", 29th International Conference on Data Engineering (ICDE), 2013, 13 pages.

Haprian, U.S. Appl. No. 17/162,564, filed Jan. 29, 2021, Final Rejection, Jun. 13, 2022.

Haprian, U.S. Appl. No. 17/080,719, filed Oct. 26, 2020, Notice of Allowance and Fees Due, Jul. 7, 2022.

Haprian, U.S. Appl. No. 17/080,698, filed Oct. 26, 2020, Final Rejection, May 18, 2022.

Oracle, "Using Property Graphs in an Oracle Database Environment", docs.oracle.com/database/122/SPGDG/using-property-graphs-oracle database.htm#BDSPA191, Apr. 23, 2018, 152 pages.

Apache TinkerPop, "The Gremlin Graph Traversal Machine and Language", tinkerpop.apache.org/gremlin.html, last viewed on Nov. 4, 2020, 6 pages.

Databricks, "Graph Analysis Tutorial with GraphFrames", dated Jul. 21, 2020, https://docs.databricks.com/spark/latest/graph-analysis/graphframes/graph-analysis-tutorial.html, 2 pages.

De Virgilio et al., "Converting Relational to Graph Databases", Proceedings of the First International Workshop on Graph Data Management Experience and Systems (GRADES 2013), Jun. 23, 2013, 6 pages.

(56) References Cited

OTHER PUBLICATIONS

Heer et al., "Software Design Patterns for Information Visualization", IEEE Transactions on Visualization and Computer Graphics, vol. 12, dated Sep. 2006, 8 pages.
Kaur, Sawinder, "Visualizing Class Diagram Using OrientDB NoSQL Data-Store", dated Jul. 2016, 5 pages.
Michels, Jan, "Property Graph Data Model—The Proposal", Individual Expert Contribution, dated Jan. 16, 2019, 76 pages.
Amazon Neptune, "Overview" https://aws.amazon.com/neptune/, last viewed on Nov. 4, 2020, 20 pages.
Neo4j Graph Platform, "What is Neo4)?", https://neo4j.com/, last viewed on Nov. 4, 2020, 14 pages.
Zemke, Fred, "Fixed Graph Patterns", ISO/IEC SC32/WG3:ERF-035, dated Sep. 14, 2018, 25 pages.
Perez et al., Ringo: Interactive Graph Analytics on Big-Memory Machines:, Proc ACM SIGMOD Int Conference Manag Data. Dated May-Jun. 2015, 21 pages.
PGQL, "Property Graph Query Language", http://pgql-lang.org/, last viewed on Nov. 3, 2020, 5 pages.
SQL Server Blog, "Graph Data Processing with SQL Server 2017 and Azure SQL Database", dated Aug. 20, 2017, 8 pages.
Tigergraph, "The Only Scalable Graph Database for the Enterprise", https://www.tigergraph.com/, last viewed on Nov. 4, 2020, 9 pages.
Xirogiannopoulos et al., "Extracting and Analyzing Hidden Graphs from Relational Databases", ACM, SIGMOD dated 2017, 18 pages.
Xirogiannopoulos et al., "GraphGen: Exploring Interesting Graphs in Relational Data", Proceedings of the VLDB Endowment, vol. 8, No. 12 Copyright 2015 VLDB Endowment, 4 pages.
Neo4j Graph Database Platform, "Cypher Query Language", https://neo4j.com/developer/cypher/, dated Nov. 4, 2020, 7 pages.
Haprian, U.S. Appl. No. 17/080,719, filed Oct. 26, 2020, Non-Final Rejection, Dec. 14, 2021.
Yousfi, U.S. Appl. No. 16/431,294, filed Jun. 4, 2019, Office Action, Apr. 6, 2020.
Yousfi, U.S. Appl. No. 16/431,294, filed Jun. 4, 2019, Notice of Allowance, Jan. 8, 2021.
Yousfi, U.S. Appl. No. 16/431,294, filed Jun. 4, 2019, Final Office Action, Jul. 8, 2020.
Yousfi, U.S. Appl. No. 16/431,294, filed Jun. 4, 2019, Advisory Action, Sep. 24, 2020.
Yousfi, U.S. Appl. No. 15/096,034, filed Apr. 11, 2016, Office Action, Apr. 10, 2018.
Yousfi, U.S. Appl. No. 15/096,034, filed Apr. 11, 2016, Notice of Allowance, Feb. 14, 2019.
Yousfi, U.S. Appl. No. 15/096,034, filed Apr. 11, 2016, Interview Summary, Nov. 23, 2018.
Yousfi, U.S. Appl. No. 15/096,034, filed Apr. 11, 2016, Final Office Action, Sep. 20, 2018.
Yousfi, U.S. Appl. No. 15/096,034, filed Apr. 11, 2016, Advisory Action, Dec. 5, 2018.
"SAP HANA Graph Reference", SAP HANA Platform 2.0 SPS 04 Document Version: 1.1 dated Oct. 31, 2019, SAP.com, 86 pages.
Trigonakis, U.S. Appl. No. 17/585,117, filed Jan. 26, 2022, Final Rejection, Jan. 22, 2024.
Haprian, U.S. Appl. No. 17/162,564, filed Jan. 29, 2021, Pre-Brief Appeal Conference decision, Oct. 6, 2023.
Haprian, U.S. Appl. No. 17/162,564, filed Jan. 29, 2021, Non-Final Rejection, Jan. 8, 2024.
Haprian, U.S. Appl. No. 17/162,564, filed Jan. 29, 2021, Advisory Action, Sep. 11, 2023.
Haprian, U.S. Appl. No. 17/080,700, filed Oct. 26, 2020, Notice of Allowance and Fees Due, Sep. 21, 2023.

* cited by examiner

Fig. 1

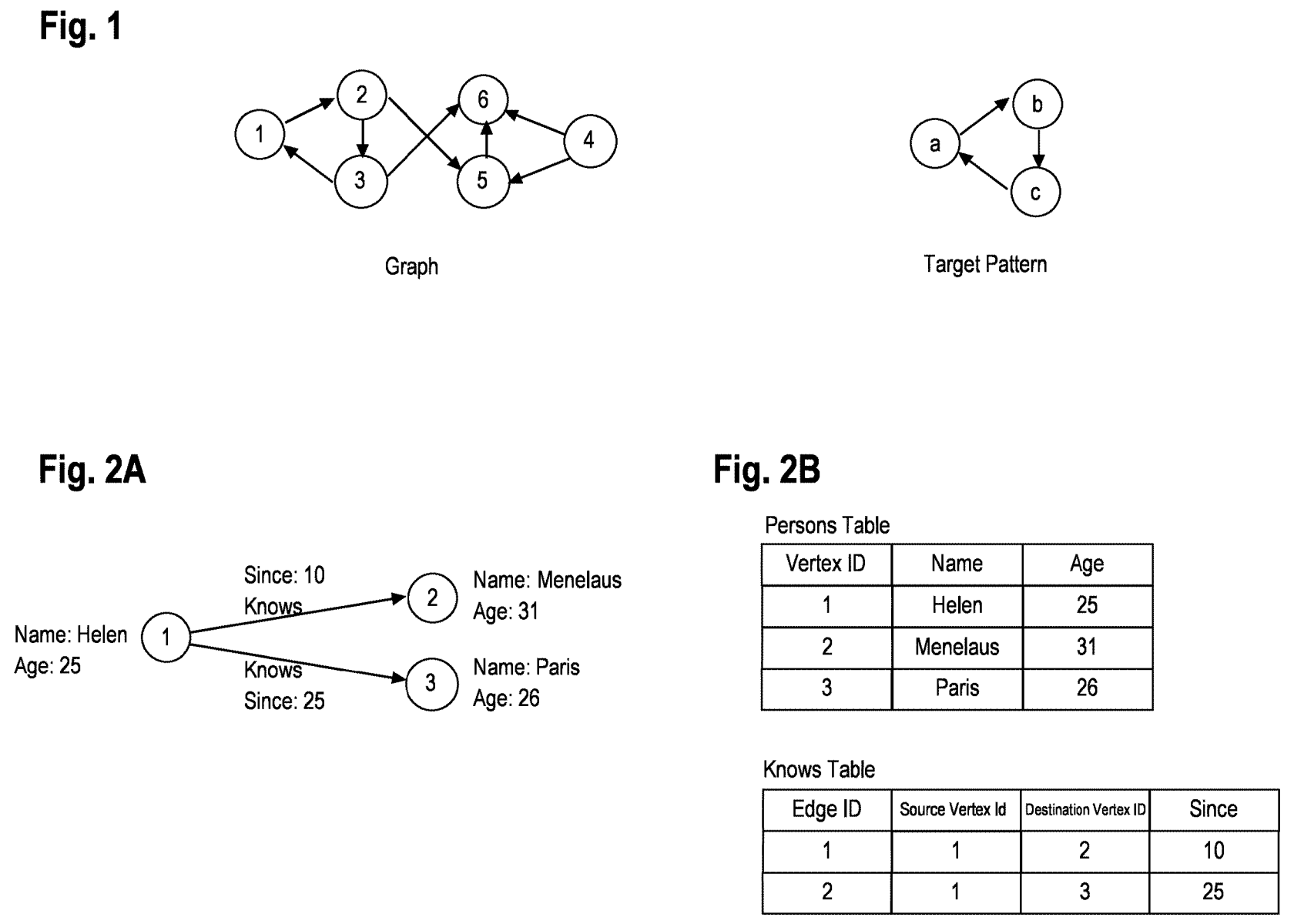

Graph

Target Pattern

Persons Table

| Vertex ID | Name | Age |
|---|---|---|
| 1 | Helen | 25 |
| 2 | Menelaus | 31 |
| 3 | Paris | 26 |

Knows Table

| Edge ID | Source Vertex Id | Destination Vertex ID | Since |
|---|---|---|---|
| 1 | 1 | 2 | 10 |
| 2 | 1 | 3 | 25 |

FAST AND MEMORY EFFICIENT IN-MEMORY COLUMNAR GRAPH UPDATES WHILE PRESERVING ANALYTICAL PERFORMANCE

FIELD OF THE INVENTION

The present disclosure relates to techniques for processing graphs. More specifically, the disclosure relates to fast and memory efficient in-memory columnar graph updates while preserving analytical performance.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

There exist challenges to updating a graph stored in an in-memory graph database or graph processing engine while providing snapshot isolation guarantees and maintaining analytical performance on the graph. For example, most graph processing engines and graph databases use special indices to accelerate the graph traversals when performing graph analytics or answering graph queries. However, it is difficult to modify these data structures to have fast updates while maintaining the performance during graph analytics and querying. Maintaining snapshot isolation—meaning adding the requirement that a user should be able to perform their analytics on a specific version of the graph not affected by concurrent new updates on the graph—provides additional difficulties as well.

There are several approaches for updating graphs. One approach is for a graph processing engine could create a new version of a graph by incorporating changes as a new set of data structures independent from the data structures of the previous graph version. By proceeding this way, it is possible to ensure the same analytical performance by leveraging read-only, fixed graph indices, such as a compressed-sparse-row (CSR) representation. However, with this approach, creating a snapshot requires a lot of resources (memory or disk) due to the full copy of data necessary and will require a lot of time to complete again due to the amount of data that has to be copied, even if this update includes the addition or deletion of a single edge.

Another approach is for a graph processing system to use a single graph index and a single set of graph storage units, in which modifications would be applied concurrently and on the same set of graph storage units (referred to as "in-place updates"). Implementations would rely on non-contiguous memory allocations for neighbor lists to be able to add/remove edges and associated properties which can hurt analytical performance or require larger memory consumption. However, with this approach, there is no snapshot isolation, and the semantics of graph analytics, such as the Pagerank algorithm or shortest-path-finding, often become meaningless and unusable.

Yet another approach is to use a graph data structure, as described above, and to add versioning information in the data-segments used for storing vertex and edge data. To be able to support multiple users manipulating different versions of the graph concurrently, the data-segments should provide the ability to get access to a previous version of that same data-segment. Due to the necessity of maintaining versioning information, and the concurrent aspect of the data structure, it can require more memory to represent the graph and also degrade the analytical performance due to the required traversals to either find the correct version of the data, or to establish what it the data at a specific version from partial representations.

Therefore, there is a need for an approach to provide fast graph updates while maintaining analytical performance.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which:

FIG. 1 illustrates an example graph and an example target pattern.

FIG. 2A illustrates an example property graph.

FIG. 2B illustrates example tables associated with the graph of FIG. 2A.

FIG. 8 illustrates an example diagram of logical and physical content of an array with delta logs.

DETAILED DESCRIPTION

Figure 3:
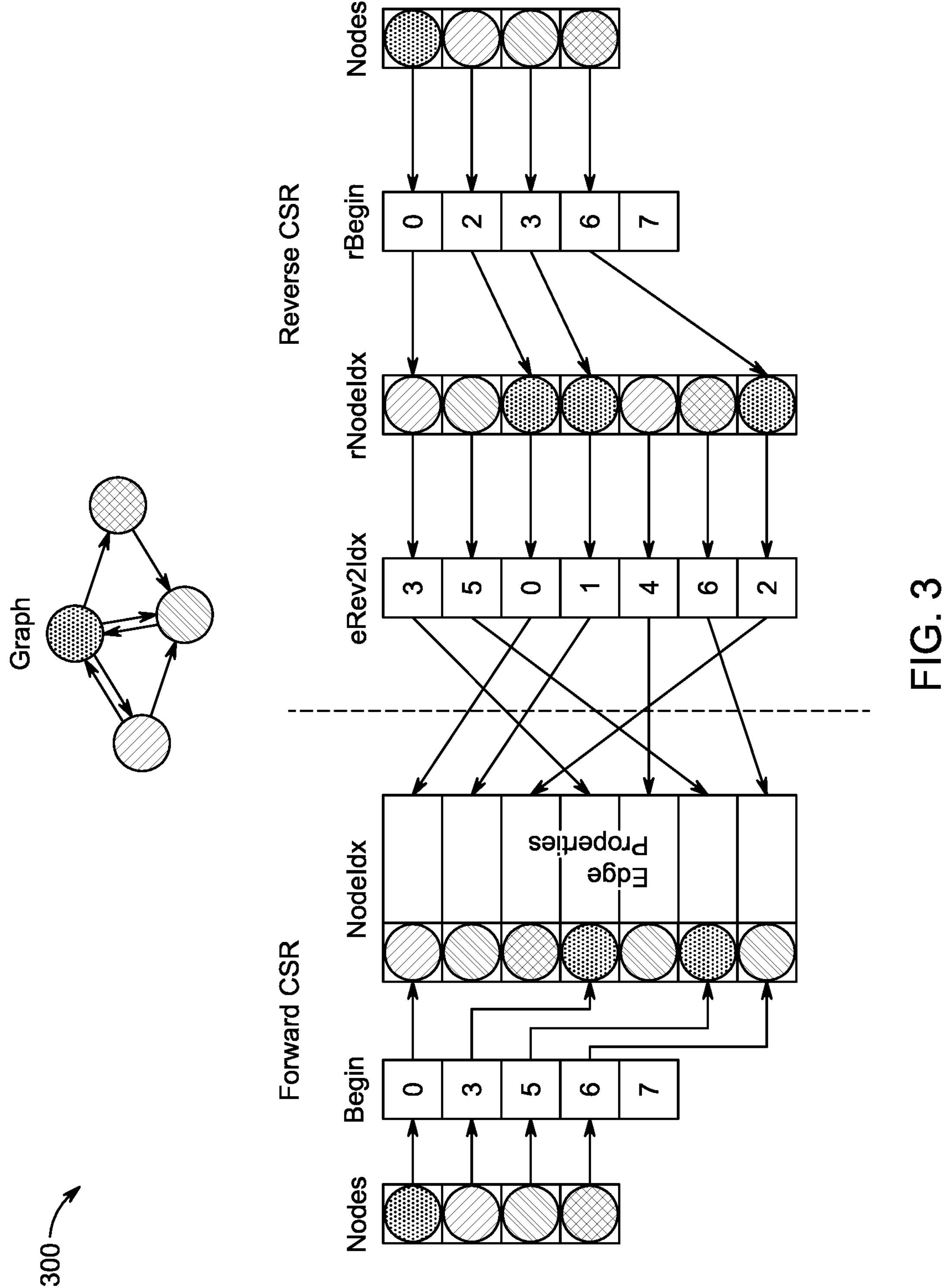
FIG. 3 illustrates an example bidirectional CSR representation with absolute indices of a graph.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques described herein update in-memory property graphs in a fast manner, while minimizing memory consumption. A graph is represented as delta compressed sparse rows (CSR), in which its data structure stores forward edge offsets that map reverse edges to forward edges, enabling fast traversals of graph edges in forward and reverse directions. To support fast graph updates, delta logs are used to store changes to the graph. In an embodiment, a base version of the graph data structure is initially loaded or created, and subsequent versions of the graph are created from the reference to the initial graph and a delta log data structure that records the changes compared to the base version of the graph.

An application of the techniques results in creation of graph snapshots isolated from previous versions of the graph, on which performance degradation for typical graph analytics tasks (e.g., executing graph algorithms or graph queries) is minimized.

Background in Graph Processing Systems

A graph is a mathematical structure used to model relationships between entities. A graph consists of a set of vertices (corresponding to entities) and a set of edges (corresponding to relationships). When data for a specific application has many relevant relationships, the data may be represented by a graph.

Graph processing systems can be split in two classes: graph analytics and graph querying. Graph analytics systems have a goal of extracting information hidden in the relationships between entities, by iteratively traversing relevant subgraphs or the entire graph. Graph querying systems have a different goal of extracting structural information from the data, by matching patterns on the graph topology.

Background in Graph Pattern Matching

Graph pattern matching refers to finding subgraphs, in a given directed graph, that are homomorphic to a target pattern. FIG. 1 illustrates an example graph and an example target pattern. If the target pattern is (a)→(b)→(c)→(a), then corresponding graph walks or paths of FIG. 1 are the following:

(1)→(2)→(3)→(1),
(2)→(3)→(1)→(2), and
(3)→(1)→(2)→(3).

One hop corresponds to a graph walk consisting of a single edge. A walk with n edges is considered as a n-hop pattern.

Translation from Relational Model to Property Graph Model

A property graph data model allows vertices and edges in a graph to have arbitrary properties as key-value pairs. FIG. 2A illustrates an example property graph. The property graph in FIG. 2A represents contact relationships between persons. The persons have name and age properties, while the relationships have a property indicting the age at which the subject knew the other person.

Conceptually, a relational DBMS may be interpreted in a graph model. For example, all vertices and their properties may be grouped in a vertex table, while all relationships and their properties may be grouped in an edge table. As an example, the graph illustrated in FIG. 2A may be stored in a RDBMS as tables, as illustrated FIG. 2B. Each vertex has a unique numerical identifier in the vertex table (e.g., Persons Table) where it is stored. Similarly, each edge has a unique numerical identifier in the edge table (e.g., Knows Table) where it is stored. The edge table can be used for matching patterns; the vertex and edge tables can then be used for accessing the desired information when the pattern is matched. The RDBMS keeps track of the referenced tables by each edge table, in order to be able to reconstruct the graph structure.

Heterogeneous In-Memory Graph

A heterogeneous in-memory graph, which is also referred to as "partitioned in-memory graph," includes one or several vertex tables and edge tables. Each of these tables includes vertices or edges of a certain type with specific sets of properties to each table. A single edge table connects edges between source and destination vertices with the constraints that the source vertices all come from a specific source vertex table and/or that the destination vertices all come from a specific destination vertex table.

Vertex Tables. A vertex table contains vertices of a specific type. For example, a vertex table may hold vertices that represent people and have properties such as FirstName, LastName, Address, etc. Users may decide to split vertex tables further, for example, by having one vertex table representing persons born in the month of September, one for persons born in October, etc. In each vertex table, the vertices are stored in a columnar-fashion (e.g., each vertex property being in a separate array).

A vertex key mapping is maintained to associate the user specified key for that vertex to an internal index for that vertex. The index associated with a vertex is a unique numerical identifier, which is referred to as a physical vertex index. Initially, when a table is created, the index is in the range [0, V) where V is the number of vertices during table loading.

In an embodiment, the physical vertex index of valid vertices remains persistent across different snapshots of the graph as long as the vertices are not deleted and can therefore be used as index into properties. Whenever new vertices are added, they may take the place of previously deleted vertex, which is referred to herein as a vertex compensation. A bit array indicates, for each physical vertex index, if the corresponding vertex is deleted in the current snapshot or not. In an embodiment, one such bit array is created per snapshot. Having such physical vertex indices stable across snapshots makes it possible to minimize disruptive changes for the edges.

Edge Tables. An edge table contains edges that are between some source vertices of a specific source vertex table and some destination vertices of a specific destination table. For example, an edge table may hold edges that represent financial transactions between bank accounts and have properties such as Amount, Currency, etc. An edge table has two special columns: a source vertex column (e.g., Source Vertex Id column in FIG. 2B) and a destination vertex column (e.g., Destination Vertex Id column in FIG. 2B), which point to the source vertex and the destination vertex of each edge and are foreign keys in the source and destination vertex tables, respectively.

Representing Graphs in Memory

A graph may be represented by compressed sparse rows (CSR). In a CSR index, edges are represented with arrays: a begin array and a node index array. The begin array lists, for each source vertex physical index, the start index of an "source vertex" edge list of that source vertex in the node index array. The node index array stores, for each edge index, the physical vertex index of the destination vertex. Edges are grouped by source vertex physical index. Additionally, they are sorted based on the physical index of the destination vertices. The contiguous segment of destination vertices belonging to the same source vertex is referred to as an edge list. The position of the edge in the node index array to be the edge index is considered. Grouping edges by source vertex into contiguous edge lists allows for efficient traversal of all outgoing edges of a given vertex. The position of the edge in the node index array is referred to as edge index.

In addition to this "forward" or "direct" CSR that represents the directed edges from source vertex to destination vertex tables, a "reverse" CSR may be generated. The reverse CSR represents the same edges as the forward CSR but in reverse direction. Analogous to the forward CSR, edges are grouped into contiguous edge lists based on their destination vertex. The reverse CSR ensures efficient traversal of incoming edges given a destination vertex. In an embodiment, edge properties are stored according to the forward CSR and not duplicated in the reverse directions. Therefore, edge properties can directly be accessed via forward edge indices.

Since edges are ordered in a different way in the reverse CSR representation, an auxiliary data structure translates reverse edge indices to the edge indices of the forward CSR. In this manner, it is possible to access edge properties when iterating over the reverse CSR representation.

FIG. 3 illustrates an example bidirectional CSR representation with absolute indices of a graph 300. The bi-direction CSR representation includes a forward CSR, a reverse CSR, and an auxiliary data structure (eRev2Idx) storing absolute indices for the graph shown in FIG. 3. The forward CSR includes a begin array (Begin) and a node index (NodeIdx) array. The reverse CSR includes a begin array (rBegin) and a node index (rNodeIdx) array. The eRev2Idx array translates reverse edge indices to the edge indices of the forward CSR. For example, eRev2Idx[0], corresponding to rNodeIdx [0], includes 3, which is used as an index into the NodeIdx array to access edge properties.

Delta CSR

Since edge properties are only stored along the forward direction, it is necessary to be able to determine to what forward edge a reverse edge corresponds to, e.g. to be able to access edge properties when traversing edges from the reverse direction. As described above, an auxiliary data structure (eRev2Idx) may be used to associate or map each reverse edge index with its forward edge index. A reverse edge index would be translated to a forward edge index according to this array and then used to access edge properties. Table 1 illustrate pseudo code of using absolute indices to access edge properties.

TABLE 1

```
long forwardEdgeIndex = eRev2Idx[reverseEdgeIndex];
// perform edge property access
double forwardEdgePropertyValue = edgeProperty[forwardEdgeIndex];
```

With such a mapping, edge insertions or deletions in the forward direction may provoke large disruptions. For example, if an edge is added to the first vertex index, the entire content of eRev2Idx must be incremented by 1, as further described below.

In an embodiment, rather than storing the eRev2Idx mapping, forward edge offsets are stored in an auxiliary data structure (eRevOffset) and the actual forward edge index (for example, when an edge property has to be accessed) is computed whenever needed at run-time. Table 2 illustrates pseudo code of using offset to access edge property.

TABLE 2

```
int srcVertexIdx = rNodeIdx[reverseEdgeIdx];
long forwardEdgeIndex = begin[srcVertexIdx] +
eRevOffset[reverseEdgeIdx];
// perform edge property access
double forwardEdgePropertyValue = edgeProperty[forwardEdgeIndex];
```

By using offsets instead of absolute indices, edge additions or deletions become less disruptive: the begin array is modified as part of updating the forward CSR, and the eRevOffset array is modified in much fewer places. The places where eRevOffset has to be modified due to the addition or deletion of edges are referred herein to as damages.

An additional advantage of the eRevOffset array is that it stores small values that can be efficiently compressed, for example using a variant encoding, or that it uses a smaller datatype than would be necessary for the eRev2Idx array.

Figure 4:
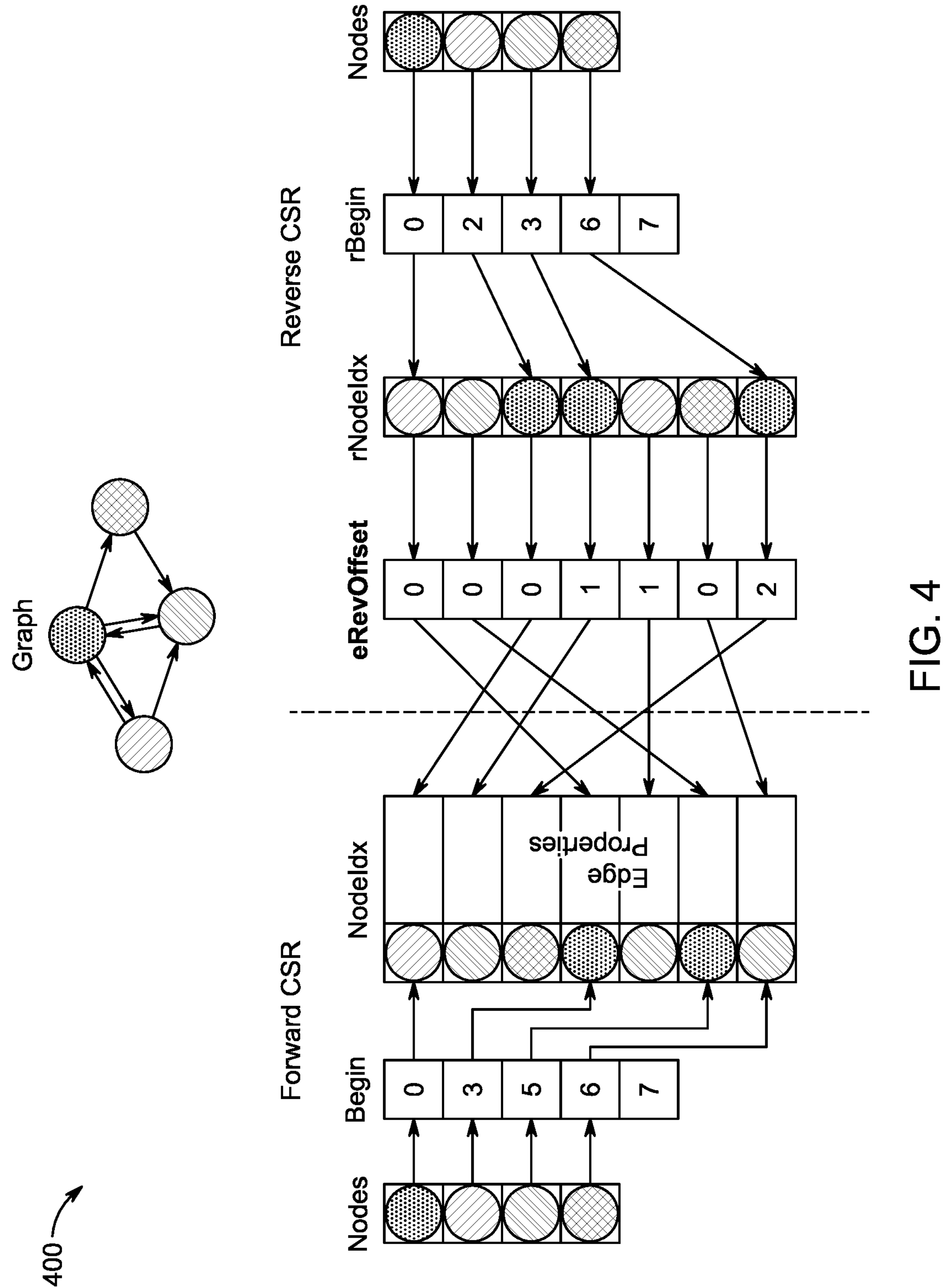
FIG. 4 illustrates an example bidirectional CSR representation with offsets of a graph.

FIG. 4 illustrates an example bidirectional CSR representation with offsets of a graph 400. The bi-directional CSR representation includes a forward CSR, a reverse CSR, and an auxiliary data structure (eRevOffset) storing offsets for the graph shown in FIG. 4. The forward CSR includes a begin array (Begin) and a node index (NodeIdx) array. The reverse CSR includes a reverse begin array (rBegin) and a reverse node index (rNodeIdx) array. The eRevOffset array stores edge offsets. For example, eRevOffset [0], corresponding to rNodeIdx[0], includes 0, which is used as an offset into the NodeIdx array to access edge properties (e.g., nodeIdx[begin[1]+offset of 0]). For another example, eRevOffset [6], corresponding to rNodeIdx[6], includes 2, which is used as an offset into the nodeIdx array to access edge properties (e.g., nodeIdx[begin[0]+offset of 2]). The forward CSR and reverse CSR of the bi-directional CSR representation with offsets are referred herein to as forward delta CSR and reverse delta CSR, respectively.

Modifications to the Offset Auxiliary Data Structure

Since edge lists are kept sorted in the forward and reverse CSR, an edge insertion or removal may happen at any place in the forward edge list. The edges after that insertion/deletion location have therefore a different edge offset by the end of the graph update (except if another edge deletion or insertion compensates that change of offset overall). This change of edge offset must be reflected in the eRevOffset array.

Figure 5:
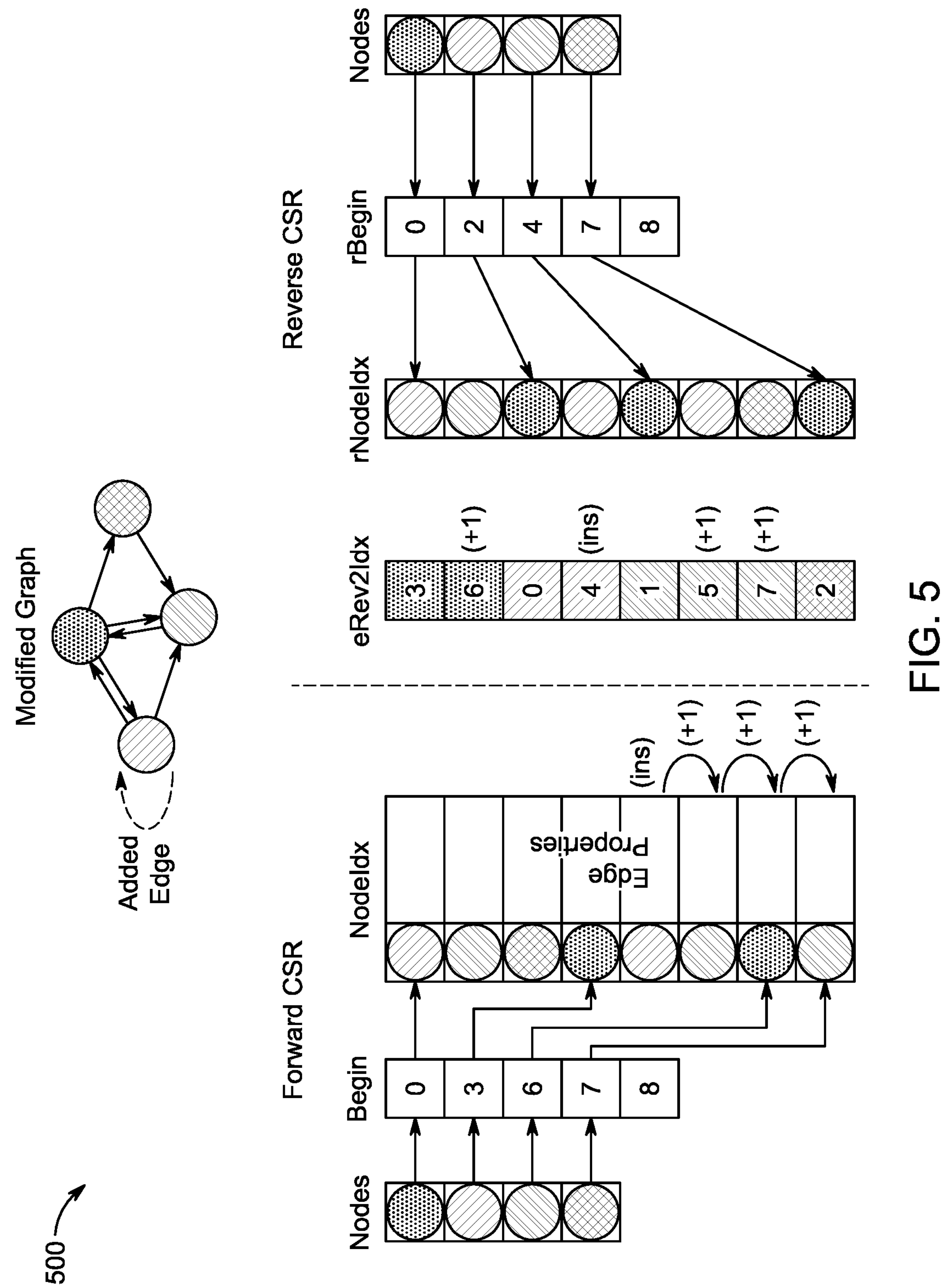
FIGS. 5-6 each illustrates an example diagram depicting example modifications to an auxiliary data structure.

FIG. 5 illustrates an example diagram 500 depicting how the eRev2Idx would be modified due to an edge insertion. In the modified graph shown in FIG. 5, an edge is added. An edge insertion impacts all the edges afterwards (in the forward direction). An entry is added to each of the nodeIdx and eRev2Idx arrays, and three (3) impacted entries in eRev2Idx array are incremented by 1.

Figure 6:
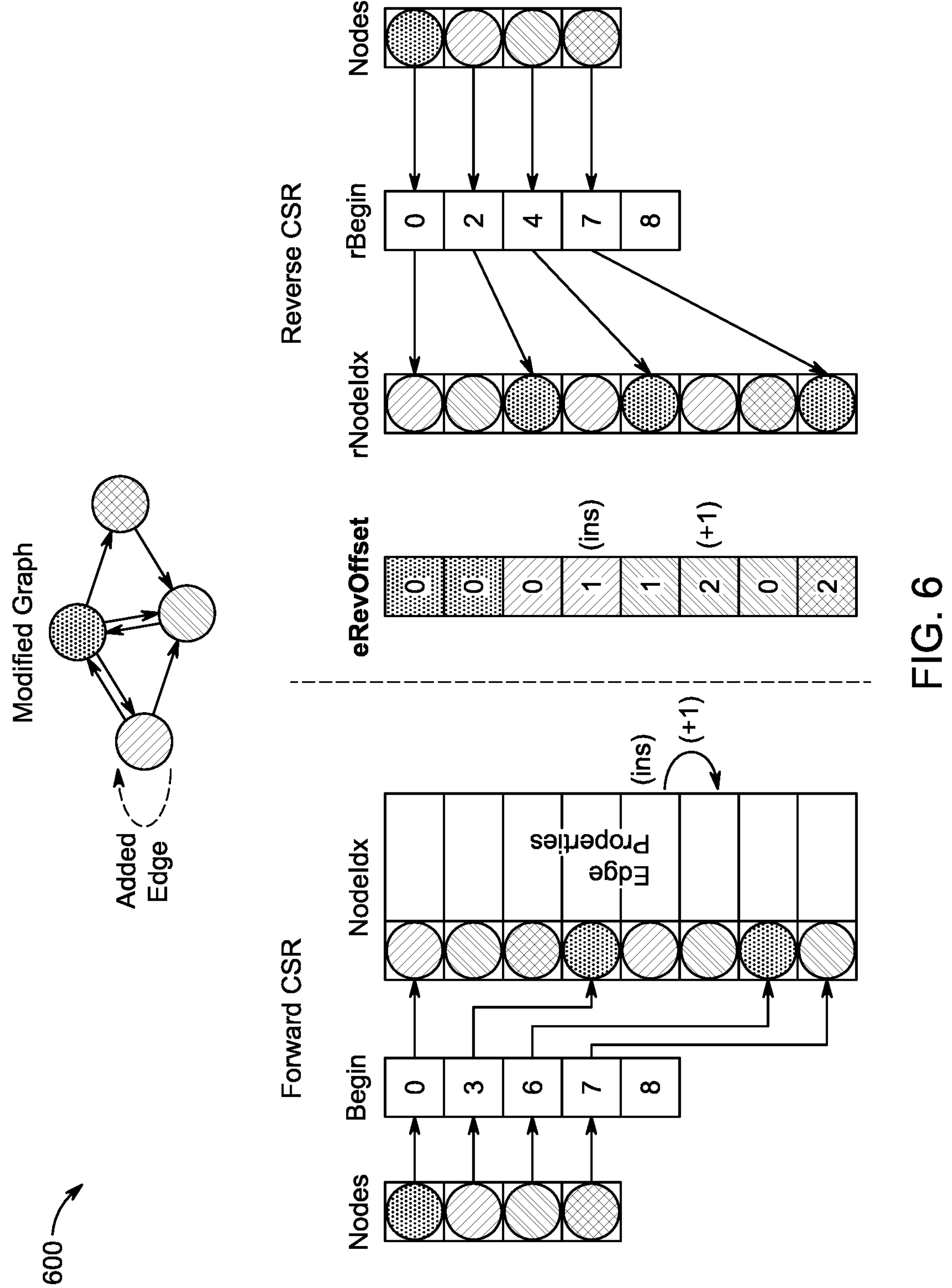

FIG. 6 illustrates an example diagram 600 depicting how the eRevOffset would be modified due to an edge insertion. In the modified graph shown in FIG. 6, an edge is added. An edge is added to each of the nodeIdx and eRevOffset arrays, and one (1) impacted entry in eRevOffset array are incremented by 1.

As illustrated in FIGS. 5 and 6, there are much fewer entries to be modified in the eRevOffset array as the impact of the insertion is limited to the edges that have the same source vertex and are located after the inserted edge. Damages are limited in scope.

From a mathematical standpoint, an edge insertion provokes in the worst case the total modification of the eRev2Idx array which is an O(E) operation, where E is the number of edges, while an edge insertion can only provoke in the worst case as many modifications in eRevOffset array as the maximum out-degree of a vertex, O(Max({out degree (v), for v in V})).

Delta Data Structures

In an embodiment, one or more data structures used in vertex and edge tables are modified to become delta data structures. Delta data structures store information in a base data structure (also referred herein to as a consolidated version of the data structure) and changes in delta logs.

When a delta log becomes too large for a delta data structure (e.g., according to a threshold considering the size of the consolidated version), a consolidation/compaction operation can be triggered, which merges content of the delta log in a new consolidated version of the delta data structure.

Data structures used in vertex and edge tables may be segmented. Segmenting the data structures used in the vertex and edge tables presents many advantages, including localizing the updates to a reduced portion of a vertex or edge table and enabling sharing data at a finer level between graph snapshots. Additionally, "normal" data structures can be used for unmodified segments to reduce overhead for analytical workloads.

Segmentation

In an embodiment, segmentation is used for different data structures. Segmentation schemes may be different for vertex and edge tables.

Vertex Table Segmentation. Each vertex table can receive modifications independently of the other tables and can therefore be segmented independently from the other tables. Inside a vertex table, a simple scheme which segments according to a fixed chosen size may be adopted, or a certain segment size may be selected to guarantee a certain number of segments. All properties associated with the vertex table follow the same segmentation scheme.

Between graph snapshots, it is possible to share data at segment granularity to maximize memory sharing, according to an embodiment.

Figure 7:
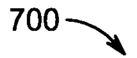
FIG. 7 illustrates an example segmentation for a forward delta-CSR index and edge properties.
Figure 7:
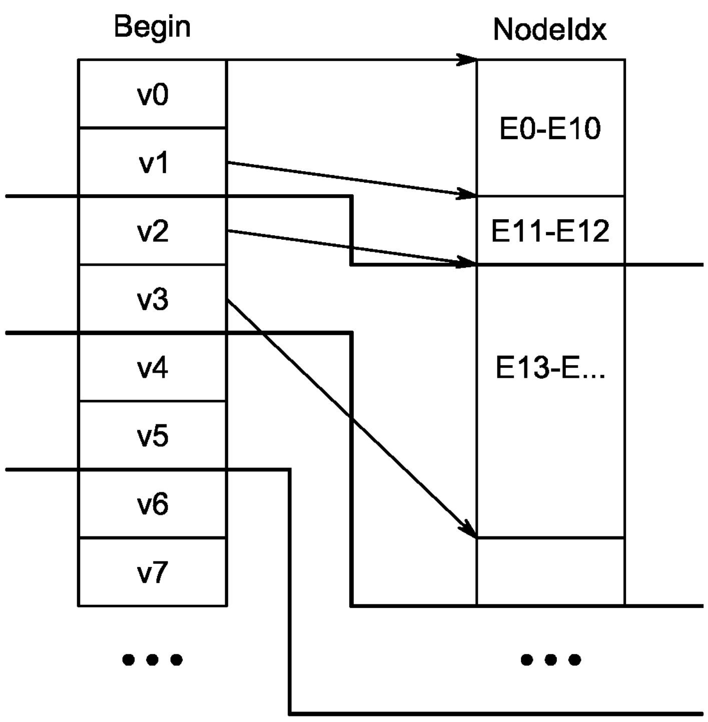

Edge Table Segmentation. In edge tables, edges are grouped by source vertices for the forward index and according to the destination vertex for the reverse index. Edge tables can be segmented in per source-vertex segments for the forward delta CSR and edge properties, as illustrated in an example diagram 700 of FIG. 7. Similarly, edge tables can be segments in per destination-vertex segments for the reverse delta CSR and eRevOffset array.

Segmentation may be based on a fixed number of edges instead of per vertex. However, in some scenarios, this may not be desirable because adding an edge to a specific segment would require remaking segments, as ordered in the array of consolidated lists, to ensure the desired segment size.

Reference Counting

Consolidated data segments and logs of each delta data structure can be shared between graphs. If a segment has no modifications at all between one version and the next, both the consolidated data array and the delta logs can be reused. If modifications were performed, the consolidated array can be reused but the delta logs will differ. In an embodiment, to keep track of the number of snapshots that use each base segment (respective log segment), a reference counter may be used at a data segment (respective log segment) scope. When a data segment (respective log segment) is not used anymore (e.g., reference counter going to 0), it is deallocated.

Data Structure Details

Techniques described herein use specialized data structures. The following discusses their uses cases in vertex and edge tables.

(Segmented) Arrays with Delta Logs. An array with delta logs includes two components:

- Array of consolidated values: A consolidated array is an array in memory that contains values at a base version.
- Delta log: A delta log is a sparse mapping (e.g., hashmap) containing the changes, e.g., modified or added values, compared to the array of consolidated values.

Changes to the array with delta logs are put into the delta log without modifying the array of consolidated values.

Figure 8:
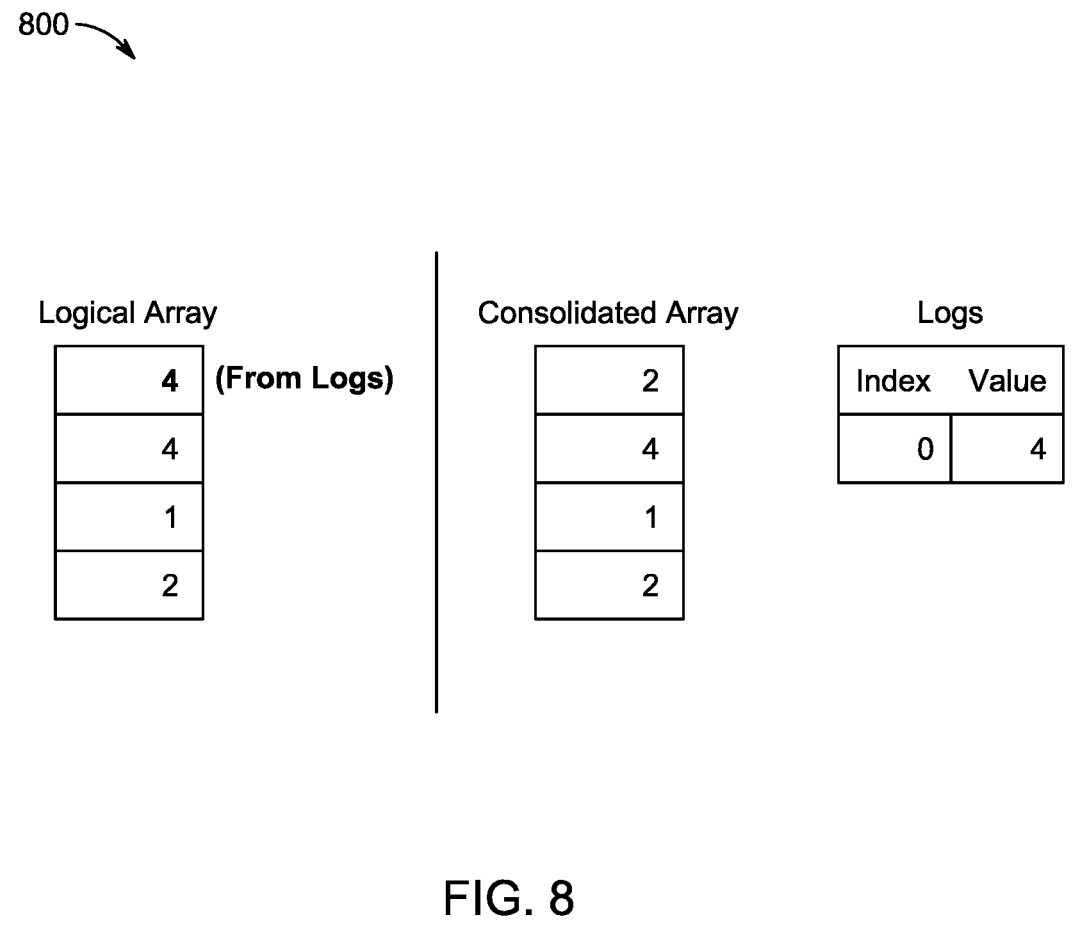

FIG. 8 illustrates an example diagram 800 of logical and physical content of an array with delta logs (delta array). Conceptually, to access a value at a specific index, it is first checked to see if the delta log has an entry for that value. If that is the case, the value will be returned from the delta log; otherwise, the value will be returned from the consolidated array.

For example, since the delta log (labeled as logs in FIG. 8) has an entry for index 0 of the logical array, the corresponding value 4 is returned. For another example, since the delta log does not have an entry for index 1 of the logical array, the value 4 at index 1 of the consolidated array is returned.

In an embodiment, when the delta log becomes too large, according to some threshold considering the size of the array of consolidated values, a consolidation operation is triggered, and content of the delta log is merged in a new consolidated array.

In an embodiment, both the consolidated array and the delta log can also be segmented so as to limit the scope of the consolidation operations to segments. It may be beneficial for graphs with skewed distributions where changes will frequently affect the same "supernodes," which will be in only a few segments if the segment size is chosen correctly.

Reference counters associated with the segments of the array of consolidated values and of the delta log are used to determine when memory de-allocation is possible (e.g., when the reference counter becomes zero).

(Segmented) List-Arrays with Delta Logs. A list-array is an array in which each cell (indexed by a list index) contains a list of variable size. A list-array with delta logs includes three components:

- Array of consolidated lists: An array of consolidated lists stores consecutively contents of lists.
- Array of consolidated list begins: An array of consolidated list begins is a lookup array that stores for each list index the start index of the corresponding list in the array of consolidated lists.
- List delta log
  - Delta lists: An array stores the content of the modified or newly added lists.
  - List positions: A sparse mapping where the key corresponds to a list index of the list-array and the value is the bitwise concatenation of the start index of the corresponding list in the delta lists array and the length of the list.

While the array of consolidated lists can be viewed to contain lists at a base version, the list delta log contains lists that have been modified or added compared to the base version. A list is modified if values in that list are modified, removed, or added. Similar to arrays with delta logs, the consolidated arrays are not modified when a change is added to the delta log.

Figure 9:
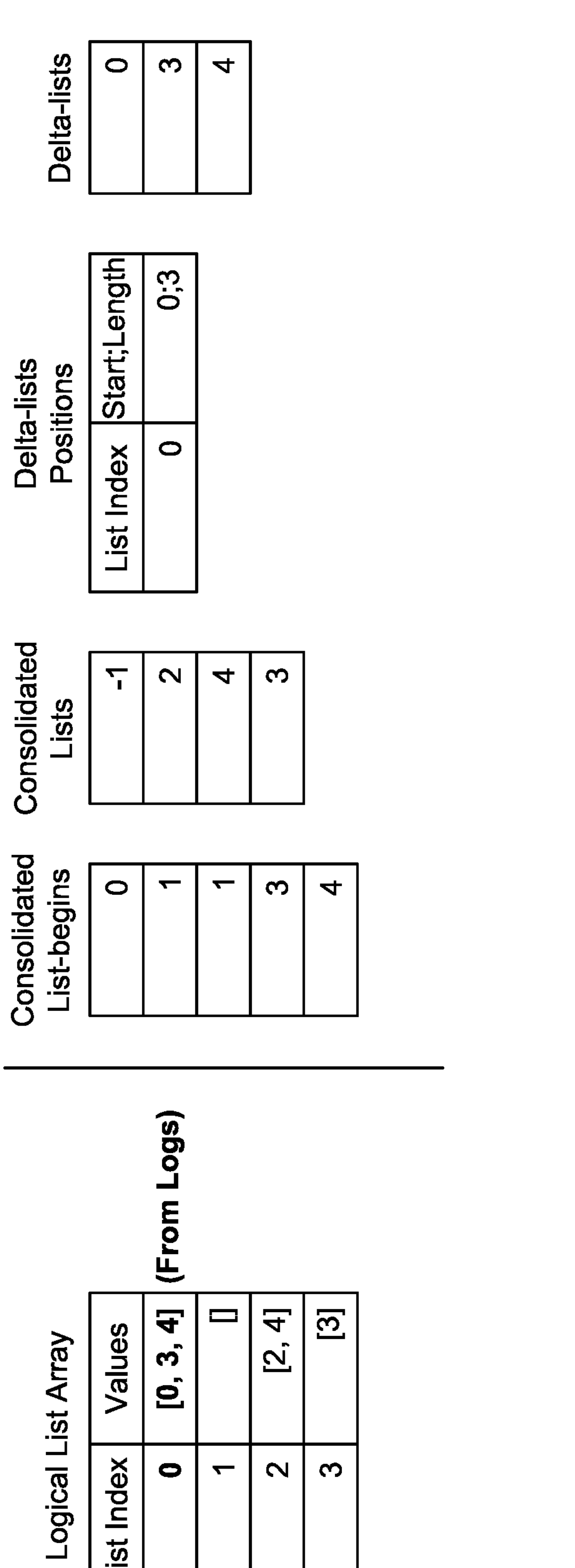
FIG. 9 illustrates an example diagram of logical and physical content of a list-array with delta logs.

FIG. 9 illustrates an example diagram 900 of logical and physical content of a list-array with delta logs (delta list array). To access a list with a specific list index, it is first checked to see if the delta log has an entry for that value. This can be achieved by querying the list starts hashmap. If the delta log contains a list for list index, it is accessed from the delta log; otherwise, it is accessed from the array of consolidated lists.

For example, since the delta lists positions array (labeled as Delta-lists Positions in FIG. 9) includes an entry for index 0 of the logical list-array, a list of [0, 3, 4] is returned by accessing the delta lists starting at index 0 to index 2 (total length of 3 as indicated in the delta lists positions). As an illustration, before graph changes, vertex 0 had one neighbor (corresponding to 1 edge, namely edge −1). After graph changes, vertex 0 has 3 neighbors (corresponding to 3 edges, namely edge 0, edge 3, edge 4).

For another example, since the delta lists positions does not have an entry for index 3 of the logical array, a list of [3] is returned by referring to the array of consolidated list begins at index [3] (e.g., having value 3) and index [4] (e.g., having value 4) to determine that one (1) value (e.g., 4−3=1) is to be accessed from the array of consolidated lists at index [3].

For yet another example, since the delta lists positions does not have an entry for index 2 of the logical array, a list of [2, 4] is returned by referring to the array of consolidated list begins at index [2] (e.g., having value 1) and index [3] (e.g., having value 3) to determine that two (2) values (e.g., 3−1=2) are to be accessed from the array of consolidated lists starting at index [1].

For yet another example, since the delta lists positions does not have an entry for index 1 of the logical array, no list is returned by referring to the array of consolidated list at index [1] (e.g., having value 1) and index [2] (e.g., having value 1) to determine that no values (e.g., 1−1=0) are to be accessed from the array of consolidated lists.

In an embodiment, when the list delta log becomes too large, according to some threshold considering the size of the array of consolidated lists, a consolidation operation is triggered, and content of the list delta log is merged in a new consolidated list array.

In an embodiment, both the consolidated list array and the list delta log can also be segmented, according to the list index, so as to limit the scope of the consolidation operations to segments. It may be especially beneficial for graphs with skewed distributions where changes will frequently affect the lists of the same "supernodes," which will be in only a few segments if the segment size is chosen correctly.

(Segmented) Block-Arrays with Delta Logs. A block-array with delta logs is a special array with delta logs that instead of storing a single value in a cell, stores a fixed sized block of data. For example, instead of having a single integer per cell, if the block size is 64, 64 values would be stored per cell. Such arrays are segmented and subject to consolidation like the other arrays.

(Segmented) Dictionary with Delta Logs. A dictionary is a bidirectional mapping that associates to a key a numerical code. The dictionary with delta logs includes two components:

- Mapping from keys to codes
  - Consolidated mapping from keys to codes: A mapping (e.g., hashmap) from keys to codes.
  - Delta mapping from keys to codes: A mapping (e.g., hashmap) that contains the changes, for example, added key-code pairs or deletions (potentially stored by mapping the deleted key to a special invalid code).
- Mapping from codes to keys
  - Consolidated mapping of codes to keys (for reverse lookup): A mapping from codes to keys. As the code space can be chosen as dense, it can be an array, in an embodiment.
  - Delta mapping of codes to keys: A mapping (e.g., hashmap) that contains the changes of codes to keys.

The consolidated mappings of the dictionary can be viewed as the dictionary for a certain base version. The delta mappings contain the changes with respect to the original version.

To get the code associated to a key, the delta dictionary is first probed. If no mapping is present for the required key (not even the invalid code value indicating a deletion), then the consolidated dictionary is probed. Consolidation and segmentation can be used for the delta mappings from keys to codes and codes to keys.

Delta Data Structures used in Vertex Tables. A bit array is used to indicate, for each physical vertex index, if the vertex is valid or deleted. This bit array can be backed by a full array or, if there are few deletions (common case), by a sparse bitset (not allocating any memory for blocks containing only valid vertices).

For vertex tables, each property is backed by dedicated arrays with delta logs. The vertex key mapping, which provides a mapping from user defined vertex keys to internal vertex index, is backed by a dictionary with delta logs.

Some additional caches, such as arrays, caching the in-degree or out-degree of vertices are also backed by arrays with delta logs.

Delta Data Structures used in Edge Tables. For each edge table, each edge property is backed by dedicated list-arrays with delta logs. The node index arrays of the forward and reverse CSRs are also backed by individual list-arrays with delta logs. If present, an edge key mapping providing a mapping from user defined edge keys to internal edge index is backed by a list-array with delta logs.

The begin arrays of the forward and reverse delta CSRs being monotonically increasing, can be encoded using a checkpoint array (a full array) and a difference array (backed block-array with delta logs). By having this encoding, even if the checkpoint array needs to be completely recomputed from one version of the graph to the next if there are edge additions or removals, it is a much smaller array than the full begin array of the normal CSR (e.g., if the block size is 64, it is 64 times smaller). The array of differences can be mostly re-used as is between versions of the graphs as adding or removing edges only change the differences of a given block (localized changes). The changes to the difference array are put in logs. This encoding is leveraged in the update of the begin array, which is further discussed below regarding the update algorithm of edge tables. Table 3 shows a pseudo code of such an encoding.

TABLE 3

```
// original monotonic and increasing array
long array[L] = {0, 2, 5, 7, 8, 9, 10}
// array of differences to the checkpointed values
// (in practice, stored in a block-array with delta-logs)
long diffs[L] = {0, 2, 5, 7, 0, 1, 2}
// checkpointed values: store every 4 values of the original array
// (4 is the "block size", can be changed to any arbitrary value,
// in practice a power of 2 is often used, e.g. 64)
long checkpoints[L/4] = {0, 8}
--
// the following equality holds for every index 0<=i<L
// division can be replaced by a bit shift when the block size is a
// power of two
array[i] = checkpoints[i/4] + diffs[i]
```

Update Algorithm

Applying changes submitted by a user to create a new graph snapshot is performed in several phases.

Pre-processing the changes submitted by the user. Before starting an application of the changes, the changes submitted by the user are validated to check if they are valid or not, using a pre-processing and validation module. Invalid changes, such as removing a non-existing edge, updating a non-existing property, etc., result in either an error being returned or being ignored.

During the validation process, the changes are also converted to a representation that is more suitable for further processing.

- Vertex changes are split by target vertex table and, within a target table, indexed by physical vertex index.
- Edge changes are split by target edge table.
- Modifications on previously existing vertices/edges are annotated with the internal indices of those vertices/edges.
- If there are deleted vertices, edge removal changes for all edges associated to those vertices are generated if not present in the edge changes.

Updating vertex tables. Each vertex table is updated independently, given a set of changes provided by the pre-processing and validation module. If there are no changes for a given vertex table, a fast path that only increments the reference counters of all the delta data structures is taken.

If there are changes for a vertex table, they are processed as follows:

1. In a first step, changes are split by change type (vertex addition, deletion, update).
2. If there are deleted vertices in the resulting snapshot, a bit array is allocated, and vertex deletions are indicated by setting the deletion bits.
3. As many vertex additions are transformed into vertex compensations as possible (compensations are possible until there are no deleted vertices indicated by the deleted vertices bit array).
   a. Indices of deleted vertices that can be used for compensation are found using a progressive binary search that first finds the first deleted vertex and then, starting from the next one, finds a second deleted vertex, etc.
   b. For each vertex addition that becomes a vertex compensation, the reused physical vertex index is set in the vertex change object.
4. If there are remaining vertex additions after the compensation procedure, they are assigned new physical vertex indices at the end of the index range (e.g., V+1, V+2, etc., where V is the number of physical vertices in the previous snapshot).
5. Modifications to the vertex key delta dictionary are performed if necessary (e.g., if there are added or removed vertices):
   a. A new delta dictionary is created, initially by copying the previous logs, and referencing the previous consolidated data.
   b. Removed vertices are added in the delta mapping from keys to code by associating an invalid code value to their previous key.
   c. Added and compensated vertices are added in the delta mapping from codes to keys and in the delta mapping from keys to codes.
   d. If some segments of the delta arrays making up the delta dictionary are eligible for consolidation/compaction, they are compacted.
6. Modifications to the vertex properties are performed per property if necessary (e.g., if there are added vertices, removed vertices, or the property is being updated for some vertex):
   a. For each property that does not need to be modified, the backing delta arrays are reused by incrementing their internal reference counters.
   b. For each property that needs to be modified, a new delta array is created, initialized to reference the data segments of the previous version of the delta array. For each segment that needs to be modified, modifications are applied by copying the old log contents if any and applying the required modifications into new logs. If some segments are eligible for consolidation/compaction, they are compacted.

Updating edge tables. Each edge table is updated independently, given a set of changes provided by the pre-processing and validation module. If there are no changes for a given edge table and there are no topological changes to the vertex tables it connects (addition or removal of vertices), a fast path that only increments the reference counters of all the delta data structures is taken.

1. In a first step, source vertex changes (e.g., vertex additions, removals, and compensations) and edge changes are sorted by source vertex, and grouped into list of changes. For a given source vertex, the group of edge changes associated to it is annotated with a value indicating if the source vertex is being added, removed, compensated, or kept as is, and how many changes of each sort (edge additions, removals, modifications) it contains.
2. In a second step, new begin delta arrays of the forward and reverse CSRs are created by incrementing/decrementing counts of edges for each source/destination vertex compared to the previous version of the graph:
   a. A new checkpoint array is created and updated to reflect required changes.
   b. A new difference array (e.g., block delta array) is created, initially referring to the data segments of the previous version of the delta array.
   c. The blocks of the difference array that need to be modified are modified by copying the old log contents if necessary and performing the required modifications in the new block logs.
   d. If needed, compaction/consolidation is performed on those arrays.
3. In a third step, the node index delta arrays of the forward and reverse CSRs are updated by copying and merging the previous logs of those delta arrays with the new topological modifications (e.g., edge insertions and removals).
   a. If needed, compaction/consolidation is performed on those arrays.
   b. During that same step, the damages for the eRevOffset values are gathered as the edge insertion and removal locations are found.
4. In a fourth step, the damages on the eRevOffset array are sorted by destination vertex so that the eRevOffset delta array can be updated. The changes are then applied to the eRevOffset delta array. If needed, compaction/consolidation is performed on this array.

5. In a fifth step, edge properties are modified if needed:
   a. For each property that does not need to be modified, the backing delta arrays are reused by incrementing their internal reference counters.
   b. For each property that needs to be modified, a new delta array is created, initialized to reference the data segments of the previous version of the delta array. For each segment that needs to be modified, modifications are applied by copying the old log contents if any and applying the required modifications into new logs. If some segments are eligible for consolidation/compaction, they are compacted.

Post-update of vertex tables. If some vertex tables have additional indices such as indices maintaining the in-degree and out-degree of vertices, then those indices are updated for each vertex table for which there were edge tables with topological changes (e.g., added or removed edges).

Compaction. Having large delta logs degrades the performance of analytical workloads because accessing values in the delta log introduces an overhead. To mitigate that, we consolidate the changes of delta-logged (list) segments once the delta-logs reach a predefined threshold into a new delta-logged (list) segment with empty logs.

Example Graph Update Process

Figure 10:
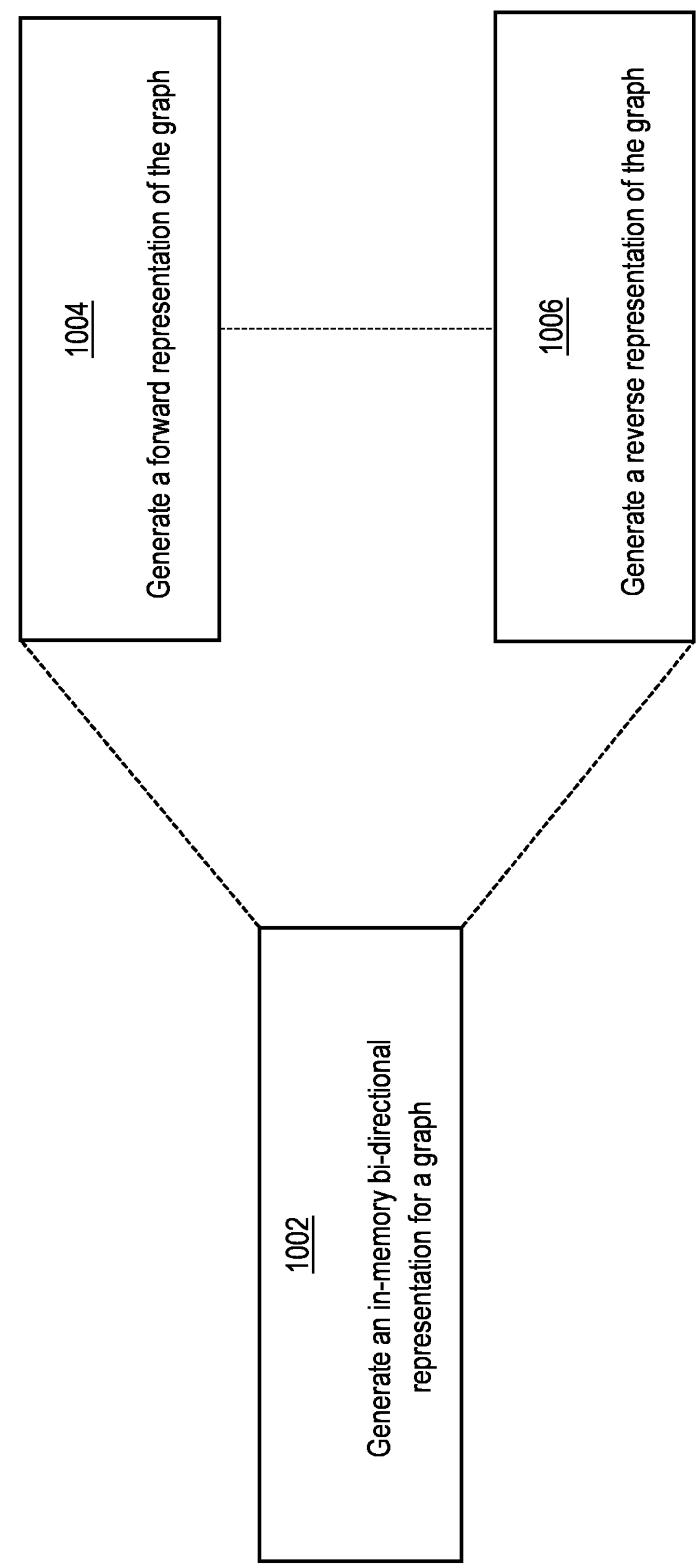
FIG. 10 illustrates an example flow diagram that depicts a process for generating an in-memory bi-directional representation for a graph.

FIG. 10 illustrates an example flow diagram that depicts a process 1000 for updating a graph. At step 1002, an in-memory bi-directional representation for a graph is generated. The graph comprises a plurality of vertices connected by a plurality of edges. Each of the plurality of edges is directed from a respective source vertex of the plurality of vertices to a respective destination vertex of the plurality of vertices. The term "array" used herein may refer to a logical array, which may be represented in memory in various data structures, such as lists, trees, heaps, etc. Elements of the array are logically sequential but may not be physically sequential in memory.

In an embodiment, the in-memory bi-directional representation for the graph is generated by generating a forward representation of the graph at step 1004 and a reverse representation of the graph at step 1006.

The forward representation generated at step 1004 includes an edge array. An example edge array is the NodeIdx array of FIG. 4. Each edge array index of the edge array holds a vertex id of a destination vertex of a respective edge that corresponds to a respective edge array index. For example, NodeIdx[0] holds the vertex id of the destination vertex (e.g., vertex with ID 0) of an edge that corresponds to NodeIdx array index 0; NodeIdx[1] holds the vertex id of the destination vertex (e.g., vertex with ID 2) of an edge that corresponds to NodeIdx array index 1; NodeIdx[2] holds the vertex id of the destination vertex (e.g., vertex with ID 3) of an edge that corresponds to NodeIdx array index 2; NodeIdx [3] holds the vertex id of the destination vertex (e.g., vertex with ID 0) of an edge that corresponds to NodeIdx array index 3; etc.

The forward representation generated at step 1004 also includes a begin array. An example begin array is the Begin array of FIG. 4. Each begin array index of the begin array is associated with a respective source vertex identified by a respective begin array index and holds an edge array index at which a respective source vertex edge list of the respective source vertex is stored sequentially within the edge array. For example, the Begin array index 0 is associated with the source vertex with ID 0 and holds the NodeIdx index 0 at which a source vertex edge list of the source vertex with ID 0 is stored sequentially within the NodeIdx array. The source vertex edge list of the source vertex with ID 0 includes destination vertex ids of all destination vertices of the source vertex with ID 0, which in this case there are three destination vertices stored sequentially from NodeIdx[0]-NodeIdx[2].

For another example, the Begin array index 2 is associated with source vertex with ID 2 and holds the NodeIdx index 5 at which a source vertex edge list of the source vertex with ID 2 is stored sequentially within the NodeIdx array. The source vertex edge list of the source vertex with ID 2 includes destination vertex ids of all destination vertices of the source vertex with ID 2, which in this case there is just one destination vertex stored at NodeIdx[5].

The reverse representation generated at step 1006 includes a reverse edge array. An example reverse edge array is the rNodeIdx array of FIG. 4. Each reverse edge array index of the reverse edge array holds a vertex id of a source vertex of a respective edge that corresponds to a respective reverse edge array index. For example, rNodeIdx[0] holds the vertex id of the source vertex (e.g., vertex with ID 1) of an edge that corresponds to rNodeIdx array index 0; rNodeIdx[1] holds the vertex id of the source vertex (e.g., vertex with ID 2) of an edge that corresponds to rNodeIdx array index 1; rNodeIdx[2] holds the vertex id of the source vertex (e.g., vertex with ID 0) of an edge that corresponds to rNodeIdx array index 2; rNodeIdx[5] holds the vertex id of the source vertex (e.g., vertex with ID 3) of an edge that corresponds to rNodeIdx array index 5; etc.

The reverse representation generated at step 1006 also includes a reverse begin array. An example reverse begin array is the rBegin array of FIG. 4. Each reverse begin array index of the reverse begin array is associated with a respective destination vertex identified by a respective reverse begin array index and holds a reverse edge array index at which a respective destination vertex edge list of the respective destination vertex is stored sequentially within the reverse edge array. For example, the rBegin array index 0 is associated with the destination vertex with ID 0 and holds the rNodeIdx index 0 at which a destination vertex edge list of the destination vertex with ID 0 is stored sequentially within the rNodeIdx array. The destination vertex edge list of the destination vertex with ID 0 includes source vertex ids of all source vertices of the destination vertex with ID 0, which in this case there are two source vertices stored sequentially from rNodeIdx[0]-rNodeIdx[1].

For another example, the rBegin array index 1 is associated with destination vertex with ID 1 and holds the rNodeIdx index 2 at which a destination vertex edge list of the destination vertex with ID 1 is stored sequentially within the rNodeIdx array. The destination vertex edge list of the destination vertex with ID 1 includes source vertex ids of all source vertices of the destination vertex with ID 1, which in this case there is just one source vertex stored at rNodeIdx [2].

The reverse representation generated at step 1006 also includes an edge offset array. An example edge offset array is the eRevOffset array of FIG. 4. Each offset array index of the edge offset array corresponds to a particular reverse edge array index and a particular edge and a particular source vertex of the particular reverse edge array index, and holds an offset to the particular edge within a respective source vertex edge list of the particular source vertex. For example, eRevOffset index 0 corresponds to rNodeIdx index 0 and an edge and a source vertex of rNodeIdx index 0, and holds an offset of 0 to that edge (e.g., the edge from the source vertex with ID 1 to the destination vertex with ID 0) within a source vertex edge list of the source vertex with ID 1. The source vertex edge list of the source vertex with ID 1 begins NodeIdx[3], and the edge in that source vertex edge list is at NodeIdx[3] (e.g., NodeIdx[3+offset of 0]).

For another example, eRevOffset index 3 corresponds to rNodeIdx index 3 and an edge and a source vertex of rNodeIdx index 3, and holds an offset of 1 to that edge (e.g., the edge from the source vertex with ID 0 to the destination vertex with ID 2) within a source vertex edge list of the source vertex with ID 0. The source vertex edge list of the source vertex with ID 0 begins NodeIdx[0], and the edge in that source vertex edge list is at NodeIdx[1] (e.g., NodeIdx [0+offset of 1]).

The eRevOffset array maps reverse to forward edges that reduces memory need as well as minimizing the number of entries that need to be updated when edges are added or removed to the graph.

The in-memory bi-directional representation for the graph accelerates traversals of the graph when performing graph analytics and/or graph queries.

In an embodiment, the plurality of vertices and the plurality of edges of the graph are stored in a plurality of tables that includes at least two vertex tables and at least one edge table. Each of the at least two vertex tables stores the plurality of vertices of a certain type with specific sets of properties. Each of the at least one edge tables stores the plurality of edges of a certain type with specific sets of properties.

Each of the plurality of tables is associated with a set of data structures for fast graph updates while maintaining the performance during graph analytics and graph queries.

In an embodiment, each property of a vertex table for the graph is associated with an array with delta logs. The array with delta logs comprises a consolidated values array storing values associated with a consolidated version of the vertex table, and a delta log data structure storing changes compared to the consolidated values array. Data structures of the array with delta logs may be segmented according to a fixed size, and one or more segments may be compacted when a consolidation threshold is satisfied.

In an embodiment, each property of an edge table for the graph is associated with a list-array with delta logs. The list-array with delta logs comprises a consolidated lists array, a consolidated list begins array, and a delta log data structure. The consolidated lists array stores lists associated with a consolidated version of the edge table. The consolidated list, begins array stores, for each consolidated list begins index, a start index of a corresponding list in the consolidated lists array. The delta log data structure comprises a delta lists array storing content of modified or newly added lists, and a list positions data structure storing, for each list positions data structure index, holds a delta lists array index and a length of a particular list. Data structures of the list-array with delta logs are segmented in per-vertex segments, and one or more segments are compacted when a consolidation threshold is satisfied.

In an embodiment, the edge array is a logical representation of a list-array with delta logs. Each of the begin array and the reverse begin array is associated with a checkpoint array and a difference array. The difference array is logical representation of a block-array with delta logs. Data structures of the block-array with delta logs are segmented in per-vertex segments, and one or more segments are compacted when a consolidation threshold is satisfied.

In an embodiment, graph changes are pre-processed and validated prior to updating the plurality of tables.

Each vertex table may be updated independently. For each vertex table that contains one or more vertex changes to the graph, if the one or more vertex changes include vertex deletions, a bit array for a corresponding vertex table may be allocated to indicate deleted vertices. If the one or more vertex changes include vertex additions, as many of the vertex additions may be transformed into vertex compensations and new vertex indices may be assigned to any remaining vertex additions that are not transformed. If the one or more vertex changes include vertex property modifications, for each property associated with the vertex property modifications, a new array of delta logs may be created based on a previous array of delta logs, and the vertex property modifications may be applied to a delta log data structure of the new array of delta logs.

Each edge table may be updated independently. For each edge table that contains one or more edge changes to the graph, if the one or more edge changes include topological edge modifications, a new begin array and a new reverse begin array may be created. For each of the new begin array and the new reverse begin array, a number of edges may be determined for each source vertex of the plurality of vertices and for each destination vertex of the plurality of vertices, and a new checkpoint array and a new difference array may be created based on the determination. In addition, the edge array may be updated by merging delta logs of a previous edge array with the topological edge modifications, and the edge offset array may be updated based on the topological edge modifications. If the one or more edge changes include edge property modifications, for each property associated with the edge property modifications, a new delta log data structure may be created based on a previous delta log data structure, and the edge property modifications may be applied to the new delta log data structure.

Techniques described herein use increase the ability of a graph system to handle evolving graphs and their associated workloads by making the graph engine faster at integrating the changes. The techniques also improve the memory consumption when it is required to keep in memory several snapshots of the graph. The techniques also provide speed and memory benefits while maintaining performance during analytical tasks (e.g., querying, graph algorithm execution). The following discusses improvements over prior approaches discussed above.

(Time-) Partitioned graph support. The techniques described herein support partitioned graphs by vertex and edge type, or by temporality. For example, edges representing financial transactions can be partitioned across several edge indices according to their insertion time. Leveraging a (timed-) partitioned graph index makes it possible to limit the work to update the graph to only the current active set (e.g., data corresponding to the current date) and, therefore, provides update speed benefits proportional to the active set size reduction.

Fast update of bidirectional graph indices. The techniques described herein map reverse to forward edges, reducing memory need as well as minimizing the number of entries that need to be updated when edges are added/removed (minimizing damages, and update algorithm using damages). Traversals of edges in forward and reverse direction are accelerated by using separate graph indices for both cases. The indices for both directions are updated using a delta logging approach. The indices for edge traversals are updated in a manner that preserves the sortedness of the initial indices. It makes it possible to apply optimizations in analytic workloads such as common neighbor matching.

Column-level delta-logging. Rather than having a single delta log to track modifications for an entire vertex or edge and its associated properties, specific segmented delta logs are created for each vertex or edge property and the indices associated to them. This saves space in situations where only some properties are frequently modified.

Vertex-centric segmentation. The techniques described herein leverage a segmentation of the data and of the delta logs according to the vertices to make the changes in the graph, which are local and non-disruptive.

Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

Query Optimization and Execution Plans

Query optimization generates one or more different candidate execution plans for a query, which are evaluated by the query optimizer to determine which execution plan should be used to compute the query.

Execution plans may be represented by a graph of interlinked nodes, each representing an plan operator or row sources. The hierarchy of the graphs (i.e., directed tree) represents the order in which the execution plan operators are performed and how data flows between each of the execution plan operators.

An operator, as the term is used herein, comprises one or more routines or functions that are configured for performing operations on input rows or tuples to generate an output set of rows or tuples. The operations may use interim data structures. Output set of rows or tuples may be used as input rows or tuples for a parent operator.

An operator may be executed by one or more computer processes or threads. Referring to an operator as performing an operation means that a process or thread executing functions or routines of an operator are performing the operation.

A row source performs operations on input rows and generates output rows, which may serve as input to another row source. The output rows may be new rows, and or a version of the input rows that have been transformed by the row source.

A match operator of a path pattern expression performs operations on a set of input matching vertices and generates a set of output matching vertices, which may serve as input to another match operator in the path pattern expression. The match operator performs logic over multiple vertex/edges to generate the set of output matching vertices for a specific hop of a target pattern corresponding to the path pattern expression.

An execution plan operator generates a set of rows (which may be referred to as a table) as output and execution plan operations include, for example, a table scan, an index scan, sort-merge join, nested-loop join, filter, and importantly, a full outer join.

A query optimizer may optimize a query by transforming the query. In general, transforming a query involves rewriting a query into another semantically equivalent query that should produce the same result and that can potentially be executed more efficiently, i.e. one for which a potentially more efficient and less costly execution plan can be generated. Examples of query transformation include view merging, subquery unnesting, predicate move-around and pushdown, common subexpression elimination, outer-to-inner join conversion, materialized view rewrite, and star transformation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
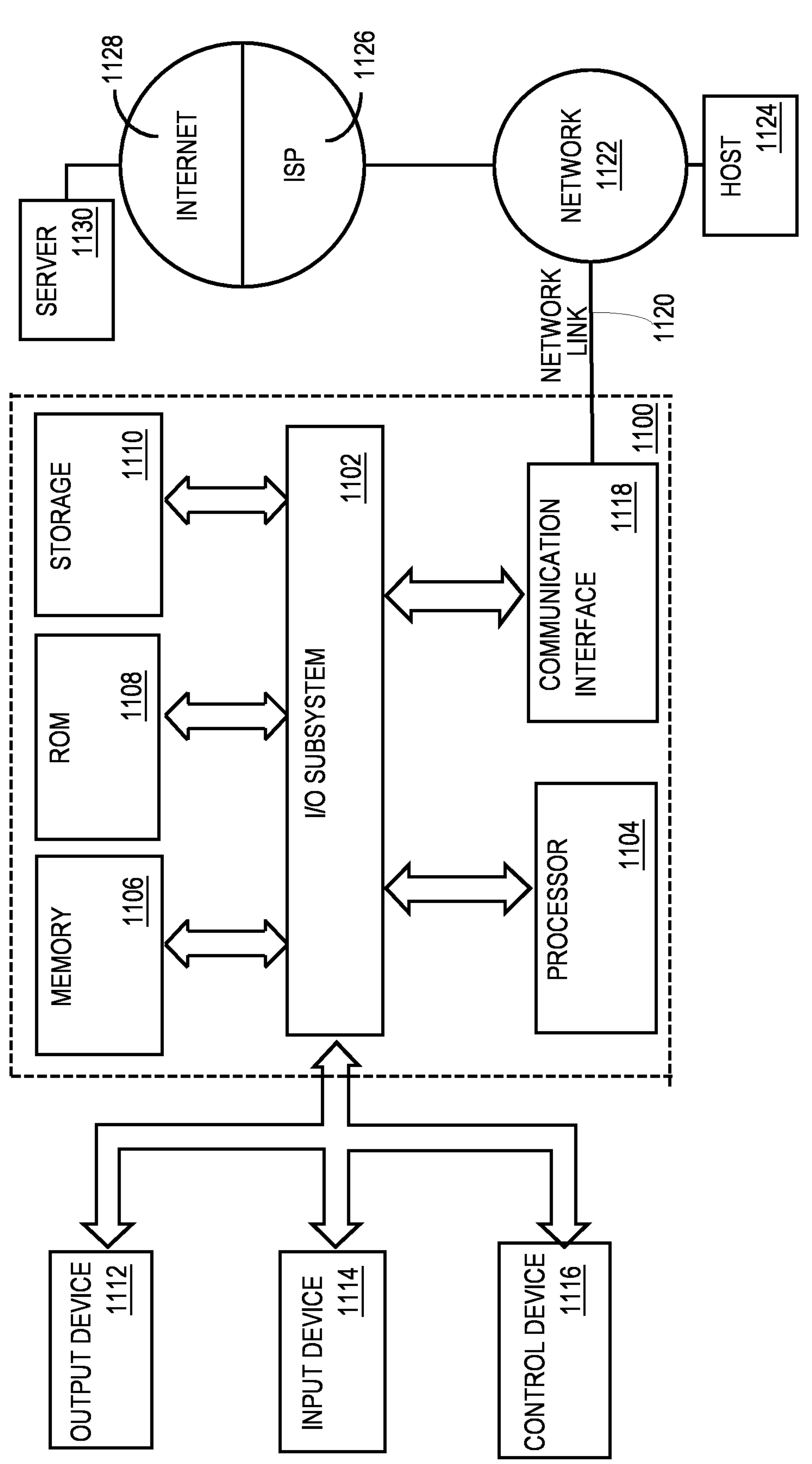
FIG. 11 illustrates a block diagram of a computing device in which the example embodiment(s) of the present invention may be embodiment.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk, optical disk, or solid-state drive is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1110. Volatile media includes dynamic memory, such as main memory 1106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic, or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the worldwide packet data communication network now commonly referred to as the "Internet" 1128. Local network 1122 and Internet 1128 both use electrical, electromagnetic, or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Software Overview

Figure 12:
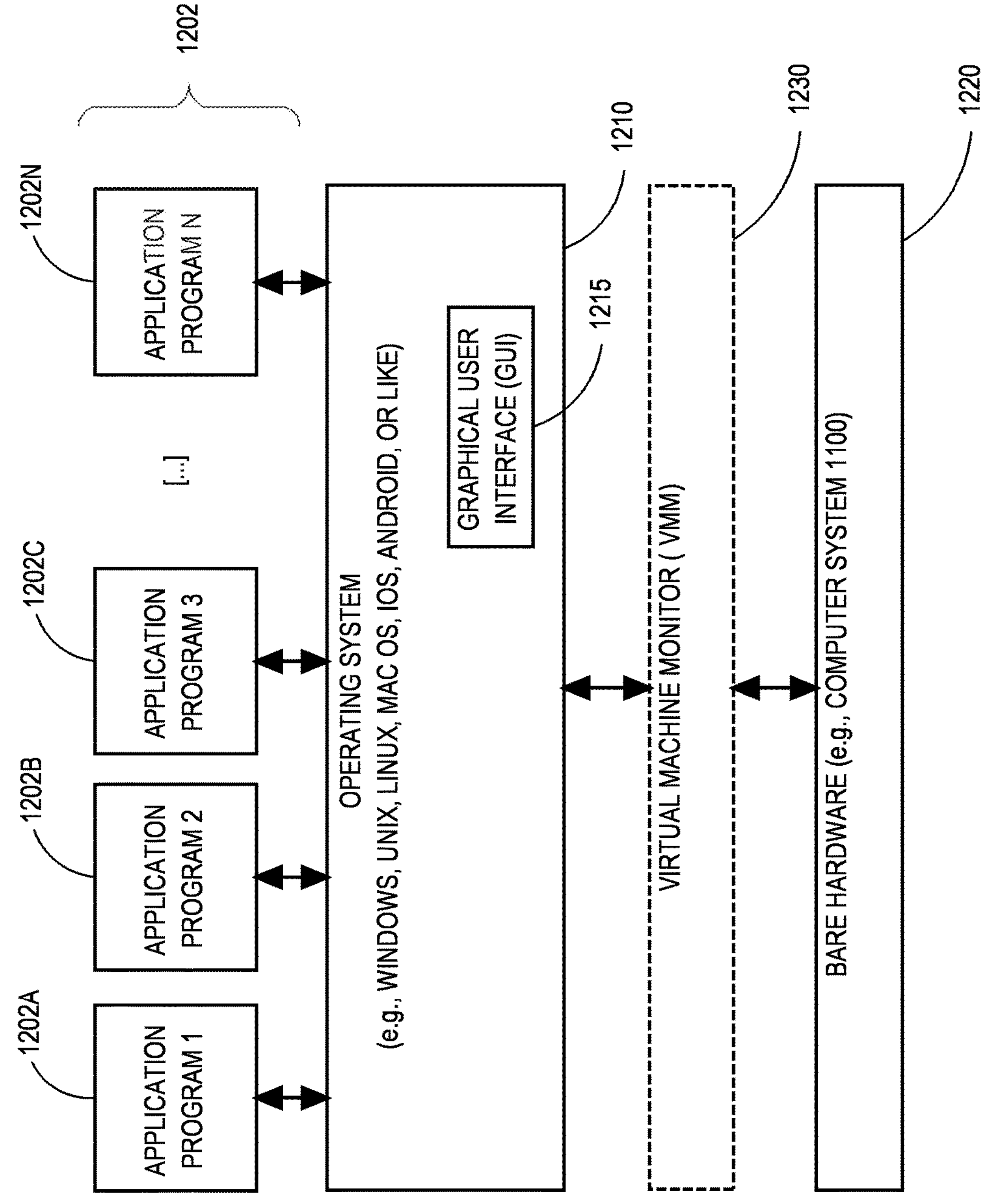
FIG. 12 illustrates a block diagram of a basic software system for controlling the operation of a computing device.

FIG. 12 is a block diagram of a basic software system 1200 that may be employed for controlling the operation of computing device 1100. Software system 1200 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1200 is provided for directing the operation of computing device 1100. Software system 1200, which may be stored in system memory (RAM) 1106 and on fixed storage (e.g., hard disk or flash memory) 1110, includes a kernel or operating system (OS) 1210.

The OS 1210 manages low-level aspects of computer operation, including managing execution of processes, memory allocation, file input and output (I/O), and device I/O. One or more application programs, represented as 1202A, 1202B, 1202C . . . 1202N, may be "loaded" (e.g., transferred from fixed storage 1110 into memory 1106) for execution by the system 1200. The applications or other software intended for use on device 1200 may also be stored as a set of downloadable computer-executable instructions, for example, for downloading and installation from an Internet location (e.g., a Web server, an app store, or other online service).

Software system 1200 includes a graphical user interface (GUI) 1215, for receiving user commands and data in a graphical (e.g., "point-and-click" or "touch gesture") fashion. These inputs, in turn, may be acted upon by the system 1200 in accordance with instructions from operating system 1210 and/or application(s) 1202. The GUI 1215 also serves to display the results of operation from the OS 1210 and application(s) 1202, whereupon the user may supply additional inputs or terminate the session (e.g., log off).

OS 1210 can execute directly on the bare hardware 1220 (e.g., processor(s) 1104) of device 1100. Alternatively, a hypervisor or virtual machine monitor (VMM) 1230 may be interposed between the bare hardware 1220 and the OS 1210. In this configuration, VMM 1230 acts as a software "cushion" or virtualization layer between the OS 1210 and the bare hardware 1220 of the device 1100.

VMM 1230 instantiates and runs one or more virtual machine instances ("guest machines"). Each guest machine comprises a "guest" operating system, such as OS 1210, and one or more applications, such as application(s) 1202, designed to execute on the guest operating system. The VMM 1230 presents the guest operating systems with a virtual operating platform and manages the execution of the guest operating systems.

In some instances, the VMM 1230 may allow a guest operating system to run as if it is running on the bare hardware 1220 of device 1100 directly. In these instances, the same version of the guest operating system configured to execute on the bare hardware 1220 directly may also execute on VMM 1230 without modification or reconfiguration. In other words, VMM 1230 may provide full hardware and CPU virtualization to a guest operating system in some instances.

In other instances, a guest operating system may be specially designed or configured to execute on VMM 1230 for efficiency. In these instances, the guest operating system is "aware" that it executes on a virtual machine monitor. In other words, VMM 1230 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Extensions and Alternatives

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method comprising:

in memory of one or more computers, storing an in-memory bi-directional representation for a graph comprising a plurality of vertices connected by a plurality of edges, wherein each of the plurality of edges is directed from a respective source vertex to a respective destination vertex;

wherein storing the in-memory bi-directional representation for the graph includes:

storing a forward representation of the graph that comprises:

an edge array that is segmented, wherein each edge array index of the edge array holds a vertex id of a destination vertex of a respective edge that corresponds to a respective edge array index;

a begin array that is segmented, wherein each begin array index of the begin array is associated with a respective source vertex identified by a respective begin array index and holds an edge array index at which a respective source vertex edge list of the respective source vertex is stored sequentially within the edge array;

storing a reverse representation of the graph that comprises:

a reverse edge array that is segmented, wherein each reverse edge array index of the reverse edge array holds a vertex id of a source vertex of a respective edge that corresponds to the respective reverse edge array index;

a reverse begin array that is segmented, wherein each reverse begin array index of the reverse begin array is associated with a respective destination vertex identified by the respective reverse begin array index and holds a reverse edge array index at which a respective destination vertex edge list of the respective destination vertex is stored sequentially within the reverse edge array;

an edge offset array that is segmented, wherein each edge offset array index of the edge offset array corresponds to a particular reverse edge array index and a particular edge and a particular source vertex of the particular reverse edge array index, wherein said particular source vertex has a particular source vertex id, wherein said each edge offset array index holds an offset for a particular edge within the edge array, wherein a sum of the offset and the offset held in the begin array at the begin array index that is equal to the particular source vertex id equals the edge array index of the particular edge;

wherein:

the plurality of vertices are stored in a plurality of tables that include at least two vertex tables, and each property of said at least two vertex tables is associated with an array with delta logs, the array with delta logs comprising (1) a consolidated values array storing values associated with a consolidated version of the vertex table (2) a delta log data structure storing changes compared to the consolidated values array; and for a new snapshot of the graph, updating said graph with graph changes to said graph, wherein said updating includes:

for each property of said at least two vertex tables that has modifications included in said changes generating a new array of delta logs based on a previous respective array of delta logs of said each property; and for each property of said at least two vertex tables without modifications included in said changes, reusing the respective array of delta logs of said each property for said new snapshot.

2. The method of claim 1, wherein the plurality of vertices and the plurality of edges are stored in a plurality of tables that includes at least two vertex tables and at least one edge table, wherein each of the at least two vertex tables stores the plurality of vertices of a certain type with specific sets of properties, wherein each of the at least one edge table stores the plurality of edges of a certain type with specific sets of properties.

3. The method of claim 1, wherein for each property of said at least two vertex tables, data structures of the respective array with delta logs of said each property are segmented according to a fixed size, wherein one or more segments are compacted when a consolidation threshold is satisfied.

4. The method of claim 1, wherein each property of an edge table for the graph is associated with a list-array with delta logs, wherein the list-array with delta logs comprises:

a consolidated lists array storing lists associated with a consolidated version of the edge table;

a consolidated list begins array storing, for each index of the consolidated list begins array, a start index of a corresponding list in the consolidated lists array;

a delta log data structure comprising:

a delta lists array storing content of modified or newly added lists;

a list positions data structure storing, for each index of the list positions data structure, a delta lists array index and a length of a particular list.

5. The method of claim 4, wherein data structures of the list-array with delta logs are segmented in per-vertex segments, wherein one or more segments are compacted when a consolidation threshold is satisfied.

6. The method of claim 1, wherein the edge array is a logical representation of a list-array with delta logs, wherein each of the begin array and the reverse begin array is associated with a checkpoint array and a difference array, wherein the difference array is logical representation of a block-array with delta logs.

7. The method of claim 6, wherein data structures of the block-array with delta logs are segmented in per-vertex segments, wherein one or more segments are compacted when a consolidation threshold is satisfied.

8. The method of claim 1, further comprising for each vertex table, for the graph, that contains one or more vertex changes to the graph:

if the one or more vertex changes include vertex deletions, allocating a bit array for a corresponding vertex table to indicate deleted vertices;

if the one or more vertex changes include vertex additions, transforming as many of the vertex additions into vertex compensations and assigning new vertex indices to any remaining vertex additions that are not transformed;

if the one or more vertex changes include vertex property modifications, for each property associated with the vertex property modifications, creating a new array of delta logs based on a previous array of delta logs, wherein the vertex property modifications are applied to a delta log data structure of the new array of delta logs.

9. The method of claim 1, further comprising for each edge table, for the graph, that contains one or more edge changes to the graph:

if the one or more edge changes include topological edge modifications, creating a new begin array and a new reverse begin array, comprising for each of the new begin array and the new reverse begin array:

determining a number of edges for each source vertex of the plurality of vertices and for each destination vertex of the plurality of vertices;

creating a new checkpoint array and a new difference array based on the determination;

updating the edge array, comprising merging delta logs of a previous edge array with the topological edge modifications;

updating the edge offset array based on the topological edge modifications;

if the one or more edge changes include edge property modifications, for each property associated with the edge property modifications, creating a new delta log data structure based on a previous delta log data structure, wherein the edge property modifications are applied to the new delta log data structure.

10. One or more non-transitory computer-readable storage media storing sequences of instructions which, when executed by one or more processors, cause:

in memory of one or more computers, storing an in-memory bi-directional representation for a graph comprising a plurality of vertices connected by a plurality of edges, wherein each of the plurality of edges is directed from a respective source vertex to a respective destination vertex;

wherein storing the in-memory bi-directional representation for the graph includes:

storing a forward representation of the graph that comprises:

an edge array that is segmented, wherein each edge array index of the edge array holds a vertex id of a destination vertex of a respective edge that corresponds to a respective edge array index;

a begin array that is segmented, wherein each begin array index of the begin array is associated with a respective source vertex identified by a respective begin array index and holds an edge array index at which a respective source vertex edge list of the respective source vertex is stored sequentially within the edge array;

storing a reverse representation of the graph that comprises:

a reverse edge array that is segmented, wherein each reverse edge array index of the reverse edge array holds a vertex id of a source vertex of a respective edge that corresponds to the respective reverse edge array index;

a reverse begin array that is segmented, wherein each reverse begin array index of the reverse begin array is associated with a respective destination vertex identified by the respective reverse begin array index and holds a reverse edge array index at which a respective destination vertex edge list of the respective destination vertex is stored sequentially within the reverse edge array;

an edge offset array that is segmented, wherein each edge offset array index of the edge offset array corresponds to a particular reverse edge array index and a particular edge and a particular source vertex of the particular reverse edge array index, wherein said particular source vertex has a particular source vertex id, wherein said each edge offset array index holds an offset for a particular edge within the edge array, wherein a sum of the offset and the offset held in the begin array at the begin array index that is equal to the particular source vertex id equals the edge array index of the particular edge;

wherein:

the plurality of vertices are stored in a plurality of tables that include at least two vertex tables, and each property of said at least two vertex tables is associated with an array with delta logs, the array with delta logs comprising (1) a consolidated values array storing values associated with a consolidated version of the vertex table (2) a delta log data structure storing changes compared to the consolidated values array; and for a new snapshot of the graph, updating said graph with graph changes to said graph, wherein said updating includes;

for each property of said at least two vertex tables that has modifications included in said changes generating a new array of delta logs based on a previous respective array of delta logs of said each property; and for each property of said at least two vertex tables without modifications included in said changes, reusing the respective array of delta logs of said each property for said new snapshot.

11. The one or more non-transitory computer-readable storage media of claim 10, wherein the plurality of vertices and the plurality of edges are stored in a plurality of tables that includes at least two vertex tables and at least one edge table, wherein each of the at least two vertex tables stores the plurality of vertices of a certain type with specific sets of properties, wherein each of the at least one edge table stores the plurality of edges of a certain type with specific sets of properties.

12. The one or more non-transitory computer-readable storage media of claim 10, wherein for each property of said at least two vertex tables, data structures of the respective array with delta logs of said each property are segmented according to a fixed size, wherein one or more segments are compacted when a consolidation threshold is satisfied.

13. The one or more non-transitory computer-readable storage media of claim 10, wherein each property of an edge table for the graph is associated with a list-array with delta logs, wherein the list-array with delta logs comprises:

a consolidated lists array storing lists associated with a consolidated version of the edge table;

a consolidated list begins array storing, for each index of the consolidated list begins array, a start index of a corresponding list in the consolidated lists array;

a delta log data structure comprising:

a delta lists array storing content of modified or newly added lists;

a list positions data structure storing, for each index of the list positions data structure, a delta lists array index and a length of a particular list.

14. The one or more non-transitory computer-readable storage media of claim 13, wherein data structures of the list-array with delta logs are segmented in per-vertex segments, wherein one or more segments are compacted when a consolidation threshold is satisfied.

15. The one or more non-transitory computer-readable storage media of claim 10, wherein the edge array is a logical representation of a list-array with delta logs, wherein each of the begin array and the reverse begin array is associated with a checkpoint array and a difference array, wherein the difference array is logical representation of a block-array with delta logs.

16. The one or more non-transitory computer-readable storage media of claim 15, wherein data structures of the block-array with delta logs are segmented in per-vertex segments, wherein one or more segments are compacted when a consolidation threshold is satisfied.

17. The one or more non-transitory computer-readable storage media of claim 10, wherein the sequences of instructions which, when executed by the one or more processors, further cause, for each vertex table, for the graph, that contains one or more vertex changes to the graph:

if the one or more vertex changes include vertex deletions, allocating a bit array for a corresponding vertex table to indicate deleted vertices;

if the one or more vertex changes include vertex additions, transforming as many of the vertex additions into vertex compensations and assigning new vertex indices to any remaining vertex additions that are not transformed;

if the one or more vertex changes include vertex property modifications, for each property associated with the vertex property modifications, creating a new array of delta logs based on a previous array of delta logs, wherein the vertex property modifications are applied to a delta log data structure of the new array of delta logs.

18. The one or more non-transitory computer-readable storage media of claim 10, wherein the sequences of instructions which, when executed by the one or more processors, further cause, for each edge table, for the graph, that contains one or more edge changes to the graph:

if the one or more edge changes include topological edge modifications, creating a new begin array and a new reverse begin array, comprising for each of the new begin array and the new reverse begin array:

determining a number of edges for each source vertex of the plurality of vertices and for each destination vertex of the plurality of vertices;

creating a new checkpoint array and a new difference array based on the determination;

updating the edge array, comprising merging delta logs of a previous edge array with the topological edge modifications;

updating the edge offset array based on the topological edge modifications;

if the one or more edge changes include edge property modifications, for each property associated with the edge property modifications, creating a new delta log data structure based on a previous delta log data structure, wherein the edge property modifications are applied to the new delta log data structure.

* * * * *